(12) United States Patent  
Tanimoto et al.

(10) Patent No.: US 6,496,212 B1
(45) Date of Patent: Dec. 17, 2002

(54) LIGHT BEAM SCANNING APPARATUS

(75) Inventors: Koji Tanimoto, Kawasaki (JP); Kenichi Komiya, Kawasaki (JP); Jun Sakakibara, Tokyo (JP); Naoaki Ide, Shizuoka (JP); Toshimitsu Ichiyanagi, Zushi (JP)

(73) Assignees: Toshiba Tec Kabushiki Kaisha, Tokyo (JP); Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/461,210

(22) Filed: Dec. 15, 1999

(30) Foreign Application Priority Data

Dec. 15, 1998 (JP) .............................. 10-356022

(51) Int. Cl.$^7$ ................................................. B41J 2/47
(52) U.S. Cl. ...................................... 347/234; 347/248
(58) Field of Search ................................ 347/233, 234, 347/235, 248, 250; 250/235, 236

(56) References Cited

U.S. PATENT DOCUMENTS

| | | | | |
|---|---|---|---|---|
| 5,289,001 A | * | 2/1994 | Arimoto et al. | 250/236 |
| 5,357,106 A | | 10/1994 | Wilson | 250/236 |
| 5,539,719 A | | 7/1996 | Motoi | 369/112 |
| 5,703,860 A | | 12/1997 | Fukunaga et al. | 346/107.1 |
| 5,883,385 A | * | 3/1999 | Takahashi et al. | 250/235 |
| 5,982,402 A | * | 11/1999 | Yoshikawa et al. | 347/116 |

FOREIGN PATENT DOCUMENTS

| | | |
|---|---|---|
| EP | 0 632 302 | 1/1995 |
| EP | 0 797 343 | 9/1997 |
| EP | 0 827 326 | 3/1998 |
| EP | 0 930 773 | 7/1999 |
| JP | 2-113715 | 9/1990 |
| JP | 4-16411 | 2/1992 |
| JP | 5-208523 | 8/1993 |
| JP | 7-72399 | 3/1995 |
| JP | 61-212818 | 3/1995 |
| JP | 7-228000 | 8/1995 |

* cited by examiner

*Primary Examiner*—Hai C. Pham
(74) *Attorney, Agent, or Firm*—Foley & Lardner

(57) ABSTRACT

A light beam position detecting device detects the passage positions of a plurality of light beams for scanning the surface of a photosensitive drum. The light beam position detecting device has a sensor pattern for generating an output which is continuously changed in a wide range with a variation in the passage position of the light beam in a sub-scanning direction perpendicular to a main scanning direction of the light beam. The sensor pattern precisely detects the relative scanning position of the light beam in a wide range. The passage positions of the plurality of light beams for scanning the surface of the photosensitive drum are controlled to a preset position based on the output of the sensor pattern.

8 Claims, 20 Drawing Sheets

LIGHT BEAM SCANNING APPARATUS

BACKGROUND OF THE INVENTION

This invention relates to an image forming apparatus such as a digital copying machine or laser printer for scanning and exposing a single light beam or a plurality of light beams emitted from a semicon-ductor laser on a photosensitive drum surface to form a single electrostatic latent image on the photosensitive drum and more particularly to a light beam scanning apparatus provided on the image forming apparatus for scanning the single light beam or the plurality of light beams.

In recent years, various types of digital copying machines for forming an image by scanning and exposing the light beam and using the electrophotographic process are developed. Recently, in order to further enhance the image forming speed, a multi-beam type digital copying machine in which a plurality of light beams are emitted to simultaneously scan a plurality of lines by use of the plurality of light beams has been developed.

The multi-beam type digital copying machine includes an optical system unit as a light beam scanning apparatus having a plurality of semiconductor laser oscillators for emitting light beams, a polygonal rotating mirror such as a polygon mirror for reflecting the light beams output from the plurality of semicon-ductor laser oscillators towards the photosensitive drum and scanning the photosensitive drum by the light beams and a collimator lens and f-θ lens as main components.

Conventionally, in the above multi-beam type digital copying machine, control of the exposure position of the light beam in the main scanning direction and control of the exposure position in the sub-the main scanning direction (that is, control of the passage position of the light beam) are effected in the optical system unit in order to form an image with high image quality.

A concrete example of the above technique is disclosed in, for example, Japanese Pat. Appln. KOKOKU Publication No. 1-43294, Japanese Pat. Appln. KOKOKU Publication No. 3-57452, Japanese Pat. Appln. KOKOKU Publication No. 3-57453, Japanese UM. Appln. KOKOKU Publication No. 5-32824, Japanese Pat. Appln. KOKAI Publication No. 7-72399, Japanese Pat. Appln. KOKAI Publication No. 7-228000, Japanese Pat. Appln. KOKAI Publication No. 9-210849, Japanese Pat. Appln. KOKAI Publication No. 9-258125, Japanese Pat. Appln. KOKAI Publication No. 9-314901 and Japanese Pat. Appln. KOKAI Publication No. 10-76704. However, the techniques disclosed in the above publications have the following problems.

That is, for control of the light beam exposure position in the main scanning direction, it is important to mount a light beam detecting device constructed by a plurality of optical sensors in a preset direction with respect to the main scanning direction of the light beam. That is, if the light beam detecting device is mounted in an inclined state, it becomes impossible to correctly detect the light beam position in the main scanning direction and, for example, there occurs a problem that a vertical line cannot be drawn straight.

However, an example indicating that the sensor itself has a function of detecting the relation between the mounting direction of the light beam detecting device and the main scanning direction of the light beam is disclosed only in Japanese Pat. Appln. KOKAI Publication No. 9-314901. Even in this example, the inclination detecting range is extremely narrow and there occurs a problem that detection and adjustment of the light beam position are difficult.

For control of the light beam position in the sub-scanning direction, examples in which the passage position of the light beam in the sub-scanning direction is replaced by time at which the light beam passes the sensor and detected are disclosed in Japanese Pat. Appln. KOKAI Publication No. 7-72399, Japanese Pat. Appln. KOKAI Publication No. 7-228000 and Japanese Pat. Appln. KOKAI Publication No. 9-210849.

However, if a variation occurs in the f-θ. characteristic of the f-θ lens mounted on the optical system unit or a variation occurs in the rotation speed of the polygon mirror, then a variation will occur in the scanning speed of the light beam on the sensor and a detection error may occur when the detection method based on the passage time of the light beam is used.

Further, in Japanese Pat. Appln. KOKAI Publication No. 9-258125, Japanese Pat. Appln. KOKAI Publication No. 9-314901 and Japanese Pat. Appln. KOKAI Publication No. 10-76704, examples in which the passage position of the light beam is driven into a portion between specified sensor patterns formed on the light beam detecting device to set the passage position of the light beam in a preset position are shown. However, with this construction, it is necessary to independ-ently drive the light beams to the preset passage position and actuators for controlling the passage positions of the light beams are required by a number corresponding to the number of light beams. That is, in comparison with a case wherein one light beam is used as a reference and the passage positions of the remaining light beams are controlled, the number of actuators is larger by one and the cost becomes higher.

Further, if the detecting pattern for driving the light beam to the preset position is used, the precision of detection is high, but a range (detection range) in which each sensor output of the detecting pattern varies with a variation in the passage position of the light beam is narrow. Therefore, the control process becomes complicated and time for the control process becomes long.

If it is possible to control the passage position of each light beam for a plurality of resolutions, the number of sensor patterns for driving each light beam is increased and the structure of the sensor becomes complicated.

BRIEF SUMMARY OF THE INVENTION

A first object of this invention is to provide a light beam scanning apparatus capable of enlarging the range (detection range) in which one sensor can respond to a variation in the passage position of a light beam, simplifying the control process and enhancing the control operation speed.

A second object of this invention is to provide a light beam scanning apparatus in which the number of actuators such as galvanomirrors for controlling the passage positions of the light beams is suppressed.

A third object of this invention is to provide a light beam scanning apparatus capable of coping with a plurality of resolutions with the simple sensor construction.

A fourth object of this invention is to provide a light beam scanning apparatus having a sensor for detecting the mounting inclination of the light beam detecting device with respect to the main scanning direction of the light beam in a wide range in the light beam detecting device.

A fifth object of this invention is to provide a light beam scanning apparatus capable of precisely detecting the passage position of the light beam irrespective of the scanning speed of the light beam on the sensor.

In order to achieve the above objects, according to one aspect of the present invention, there is provided a light beam scanning apparatus comprising: light beam emitting means for outputting a light beam; a beam scanner for reflecting the light beam output from the light beam emitting device towards a to-be-scanned surface to scan the to-be-scanned surface by use of the light beam in a main scanning direction; a first beam position detector for detecting the light beam scanned on the to-be-scanned surface by the beam scanner and generating an analog signal which is continuously changed with a variation in the passage position in a sub-scanning direction perpendicular to the main scanning direction of the light beam; and controller for controlling the position of the light beam scanned by the beam scanner on the to-be-scanned surface to a preset position based on the result of detection of the first beam position detector.

Further, according to this invention, a plurality of light beam emitting devices are provided and the beam scanner scans the to-be-scanned surface by use of a plurality of light beams emitted from the plurality of light beam emitting devices. The scanning apparatus further comprises light beam passage position changing means of a number smaller than the number of the plurality of light beam emitting devices by one, for changing the passage position of the light beam in the sub-scanning direction. The controller determines one of the plurality of light beams as a reference beam and changing the relative passage position of the remaining light beams with respect to the passage position of the reference light beam by use of the light beam passage position changing means.

Therefore, the number of actuators such as galvanomirrors for controlling the passage positions of the light beams can be suppressed. Further, the relative passage positions of the plurality of light beams can be precisely detected irrespective of the scanning speed of the light beam on the sensor.

According to another aspect of the present invention, there is provided a light beam scanning apparatus comprising: a plurality of light beam emitting devices for outputting light beams; a beam scanner for reflecting the light beams output from the light beam emitting devices towards a to-be-scanned surface to scan the to-be-scanned surface by use of the light beams in a main scanning direction; a first beam position detector for detecting the light beam scanned on the to-be-scanned surface by the beam scanner and generating an analog signal which is continuously changed with a variation in the passage position in a sub-scanning direction perpendicular to the main scanning direction of the light beam; a first target light detecting member having a first passage target and disposed separately from the first beam position detector in the main scanning direction; a second target light detecting member having a second passage target separated from the first passage target in the sub-scanning direction by a distance corresponding to preset resolution; light beam passage position changing means for changing the passage position of at least one of the plurality of light beams; and a controller for controlling the relation of the respective passage positions of the plurality of light beams to a preset relation by use of the light beam passage position changing means based on the outputs of the first beam position detector respectively obtained when the light beam has passed through the first and second passage targets.

There is further provided a light beam scanning apparatus the above, wherein the controller includes: calculating means for calculating a difference between the outputs of the first beam position detector respectively obtained when the light beam has passed through the first and second passage targets; and means for changing the passage position of one of first and second light beams among the plurality of light beams by use of the first beam passage position changing means to set the difference calculated by the calculating means equal to a difference between outputs of the beam position detector respectively obtained at the time of scanning by the first and second light beams.

There is further provided a light beam scanning apparatus the above, wherein the first beam position detector includes second and third beam position detectors; the second beam position detector generates an output which continuously decreases with a variation in the passage position of the light beam in the sub-scanning direction, the third beam position detector is disposed separately from the second beam position detector in the sub-scanning direction and generates an output which continuously increases with a variation in the passage position of the light beam, and the controller controls the passage position of the light beam to a preset position based on the results of detection of the second and third beam position detectors.

There is further provided a light beam scanning apparatus the above, further comprising: a fifth beam position detector disposed separately from the second and third beam position detectors in the main scanning direction, for detecting the light beam used for scanning the to-be-scanned surface by the beam scanner and generating an output which continuously decreases with a variation in the passage position of the light beam; a sixth beam position detector disposed adjacent to the fifth beam position detector in the sub-scanning direction, for detecting the light beam used for scanning the to-be-scanned surface by the beam scanner and generating an output which continuously increases with a variation in the passage position of the light beam; and inclination detecting means for detecting whole inclinations of the second to sixth beam position detectors with respect to the scanning direction of the light beam based on the results of detection of the second, third, fifth and sixth beam position detectors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described an embodiment of this invention with reference to the accompanying drawings.

Figure 1:
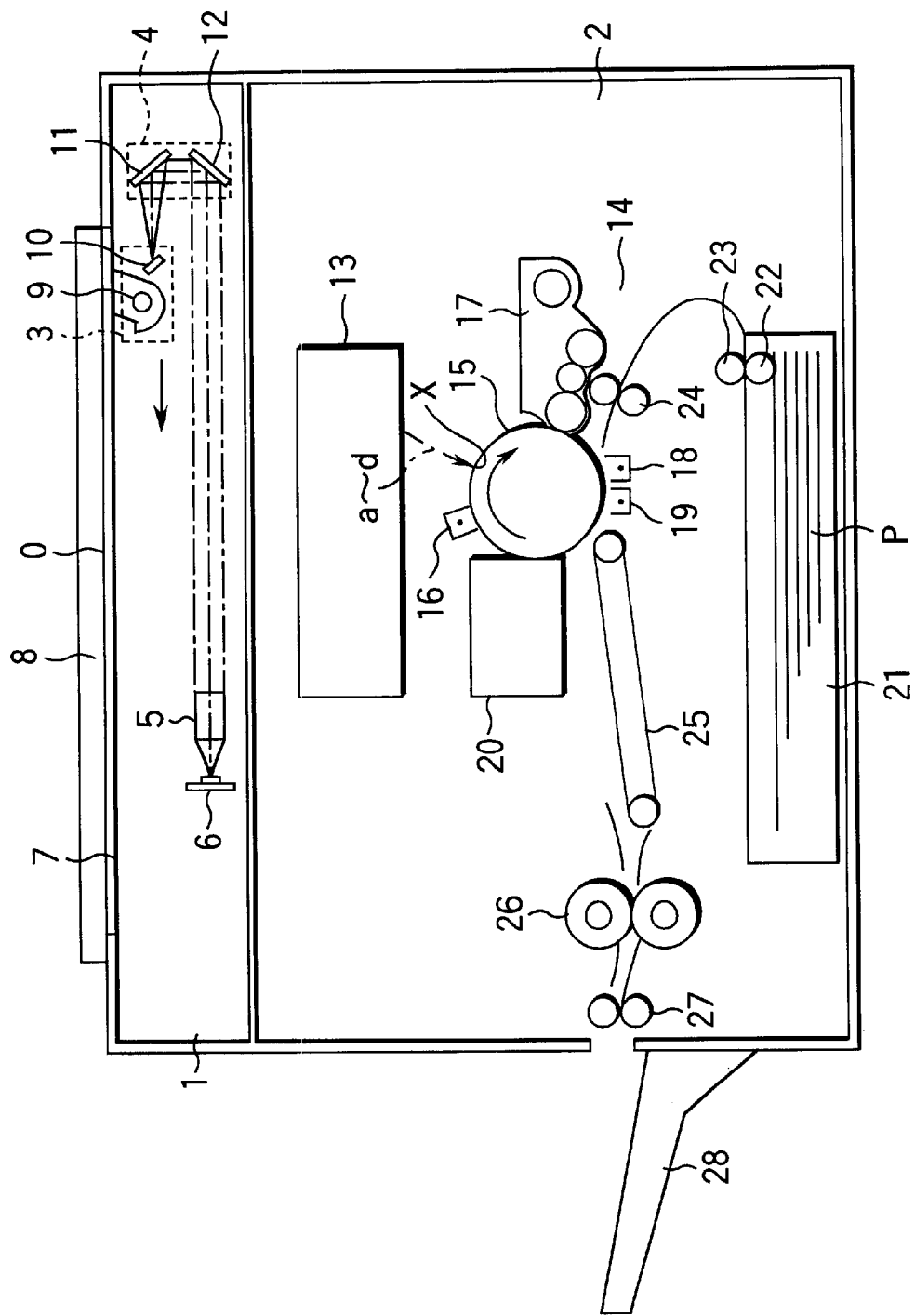
FIG. 1 is a structural view schematically showing the structure of a digital copying machine according to an embodiment of this invention.

FIG. 1 schematically shows the structure of a digital copying machine used as an image forming apparatus to which a light beam scanning apparatus according to an embodiment of this invention is applied. That is, the digital copying machine includes, for example, a scanner section 1 used as image reading means and a printer section 2 used as image forming means. The scanner section 1 includes a first carriage 3 and second carriage 4 movable in a direction indicated by an arrow in FIG. 1, image forming lens 5 and photoelectric conversion device 6.

In FIG. 1, an original O is placed on an original table 7 formed of transparent glass with the front surface down and the front right side in the short-side direction of the original table 7 is set as the center reference for the reference of placement of the original O. The original O is pressed on the original table 7 by an original fixing cover 8 freely set in the open/closed state.

The original O is illuminated by a light source 9 and reflected light from the original is converged onto the light receiving surface of the photoelectric conversion device 6 via mirrors 10, 11, 12 and image forming lens 5. The first carriage 3 having the light source 9 and mirror 10 mounted thereon and the second carriage 4 having the mirrors 11, 12 mounted thereon are moved in a relative speed of 2:1 to set the length of the optical path constant. The first carriage 3 and second carriage 4 are moved from the right side to the left side in synchronism with a read timing signal by a carriage driving motor (not shown).

The image of the original O thus placed on the original table 7 is sequentially read for each line by the scanner section 1 and a read output is converted into an 8-bit digital image signal indicating the density of the image in an image processing apparatus (not shown).

The printer section 2 includes an image forming section 14 having a combination of an optical system unit 13 and an electrophotographic system capable of forming the image on paper P which is an image forming medium. That is, an image signal read from the original O by the scanner section 1 is converted to a light beam (which is hereinafter simply referred to as a light beam) from the semiconductor laser oscillator after it is processed in the image processing section (not shown). In this embodiment, a multi-beam optical system using a plurality of (two or more) semiconductor laser oscillators is used.

The construction of the optical system unit 13 is explained later in detail, but a plurality of semiconductor laser oscillators provided in the unit effect the light emitting operation according to a laser modulation signal output from the image processing section (not shown) and a plurality of light beams emitted from the laser oscillators are reflected by the polygon mirror, used as scanning lights and output to the exterior of the unit.

A plurality of light beams emitted from the optical system unit 13 are converged as the scanning light of a spot having necessary resolution on a point of the exposing position X on the photosensitive drum used as an image carrier and scanned for exposure. As a result, an electrostatic latent image corresponding to an image signal is formed on the photosensitive drum 15.

An electric charger 16 for charging the surface of the photosensitive drum 15, developing unit 17, transfer charger 18, separation charger 19, cleaner 20 and the like are arranged around the photosensitive drum 15. The photosensitive drum 15 is rotated at a preset circumferential speed by a driving motor (not shown) and charged by the electric charger 16 set to face the surface thereof. A plurality of light beams (scanning light) are converged in a spot form on the point of exposure position X on the charged photo-sensitive drum 15.

The electrostatic latent image formed on the photosensitive drum is developed by use of toner (developing agent) from the developing unit 17. The toner image formed on the photosensitive drum 15 by the development process is transferred to paper P supplied at adequate timing by the paper feeding system on a point of the transferring position by the transfer charger 18.

The paper feeding system separately feeds sheets of paper P in the paper feeding cassette 21 provided in the bottom portion for each sheet by use of a paper feeding roller 22 and separation roller 23. Then, the paper is fed to a resist roller 24 and supplied to the transfer position at preset timing. On the downstream side with respect to the transfer charger 18, a paper feeding mechanism 25, fixing unit 26 and a paper discharging roller 27 for discharging paper P which has been subjected to the image forming process are provided. With this construction, the toner image on the paper P on which the toner image has been transferred is fixed by the fixing unit 26 and then the paper P is discharged to an external paper discharging tray 28 via the paper discharging roller 27.

The remaining toner on the surface of the photosensitive drum 15 from which the image has been transferred to the paper P is removed by the cleaner 20, and it is restored into the initial state and set into the standby state for formation of a next image.

The above operation is repeatedly effected to continuously effect the image forming operation.

As described above, the original O placed on the original table 7 is read by the scanner section 1 and information read by the scanner section is subjected to a series of processes in the printer section 2 and then recorded on the paper P as a toner image.

Next, the optical system unit 13 is explained.

Figure 2:
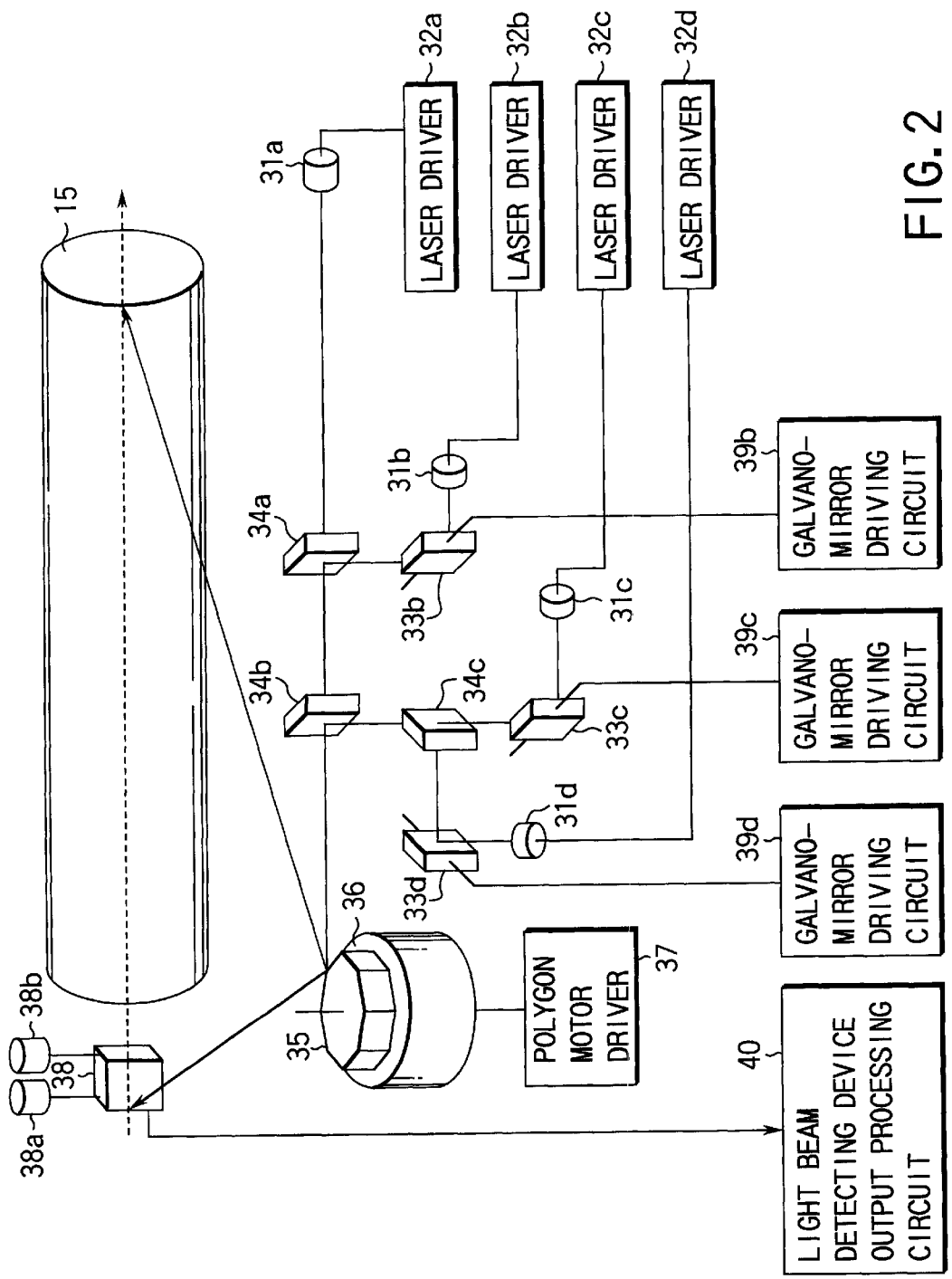
FIG. 2 is a view showing the positional relation between the structure of the optical system unit and the photosensitive drum.

FIG. 2 shows the positional relation between the structure of the optical system unit 13 and the photo-sensitive drum 15. The optical system unit 13 contains semiconductor laser oscillators 31a, 31b, 31c, 31d as four light beam emitting means, for example, and the high-speed image forming process can be attained without extremely enhancing the rotation speed of the polygon mirror by causing the semiconductor laser oscillators 31a, 31b, 31c, 31d to simultaneously effect image formation for the respective scanning lines.

That is, the laser oscillator 31a is driven by a laser driver 32a, and a light beam output therefrom passes through half mirrors 34a, 34b after passing through a collimator lens (not shown) and is made incident on a polygon mirror 35 used as a polygonal rotating mirror.

The polygon mirror 35 is rotated at a constant speed by a polygon motor 36 driven by a polygon motor driver 37. Thus, reflected light from the polygon mirror 35 scans in a preset direction at an angular speed determined by the rotation speed of the polygon mirror 36. The light beam scanned by the polygon mirror 35 passes through an f-θ lens (not shown) and scans the surface of the photosensitive drum 15 and the light receiving surface of a light beam detecting device 38 acting as light beam power detecting means, light beam passage timing detecting means and light beam position detecting means at a constant speed according to the f-θ characteristic of the f-θ lens.

The laser oscillator 31b is driven by a laser driver 32b and a light beam output therefrom is reflected by a galvanomirror 33b after passing through a collimator lens (not shown) and is further reflected by a half mirror 34a. The reflected light from the half mirror 34a passes through a half mirror 34b and is made incident on the polygon mirror 35. The path along which the light beam is transmitted after being reflected by the polygon mirror 35 is the same as in the case of the light beam emitted from the laser oscillator 31a and it passes through the f-θ lens (not shown) and scans the surface of the photosensitive drum 15 and the light receiving surface of the light beam detecting device 38 at a constant speed.

The laser oscillator 31c is driven by a laser driver 32c and a light beam output therefrom is reflected by a galvanomirror 33c after passing through a collimator lens (not shown), passes through a half mirror 34c and is reflected by a half mirror 34b and made incident on the polygon mirror 35. The path along which the reflected light is transmitted after being reflected by the polygon mirror 35 is the same as in the case of the light beams emitted from the laser oscillators 31a, 31b and it passes through the f-θ lens (not shown) and scans the surface of the photosensitive drum 15 and the light receiving surface of the light beam detecting device 38 at a constant speed.

The laser oscillator 31d is driven by a laser driver 32d and a light beam output therefrom is reflected by a galvanomirror 33d after passing through a collimator lens (not shown) and is reflected by a half mirror 34c, reflected by the half mirror 34b and made incident on the polygon mirror 35. The path along which the reflected light is transmitted after being reflected by the polygon mirror 35 is the same as in the case of the light beams emitted from the laser oscillators 31a, 31b, 31c and it passes through the f-θ lens (not shown) and scans the surface of the photo-sensitive drum 15 and the light receiving surface of the light beam detecting device 38 at a constant speed.

The laser drivers 32a to 32d contain automatic power control (APC) circuits and drive the laser oscillators 31a to 31d to always emit lights at light emission power levels set by a main control section (CPU) 51 as will be described later.

Light beams thus output from the different laser oscillators 31a, 31b, 31c, 31d are combined by the half mirrors 34a, 34b, 34c and four light beams are transmitted towards the polygon mirror 35.

Therefore, the four light beams can simultaneously scan the surface of the photosensitive drum 15 and record an image at speed four times that of the conventional single beam case if the rotation speed of the polygon mirror 35 is the same.

The galvanomirrors 33b, 33c, 33d adjust (control) the positional relation of the light beams output from the laser oscillators 31b, 31c, 31d in the sub-scanning direction with respect to the light beam output from the laser oscillator 31a and galvanomirror driver circuits 39b, 39c, 39d for driving the galvanomirrors are respectively connected thereto.

Further, light beam detecting device adjusting motors 38a, 38b for adjusting the mounting position of the light beam detecting device 38 and the inclination thereof with respect to the scanning direction of the light beam are mounted on the light beam detecting device 38.

The light beam detecting device 38 detects the passage positions, passage timings and powers of the four light beams and is arranged near the end portion of the photosensitive drum 15 such that the light receiving surface thereof can be set in flush with the surface of the photosensitive drum 15. Control of the galvanomirrors 33b, 33c, 33d for the respective light beams (control of the image forming position in the sub-scanning direction), control of light emission powers (intensity) of the laser oscillators 31a, 31b, 31c and control of the light emission timings thereof (control of the image forming position in the main scanning direction) are effected based on the detection signal from the light beam detecting device 38 (the control processes are explained later in detail). The beam detecting device 38 generates analog signals according to the result of the detection. In order to form analog signals to effect the control processes, a light beam detecting device output processing circuit 40 is connected to the light beam detecting device 38.

Figure 3:
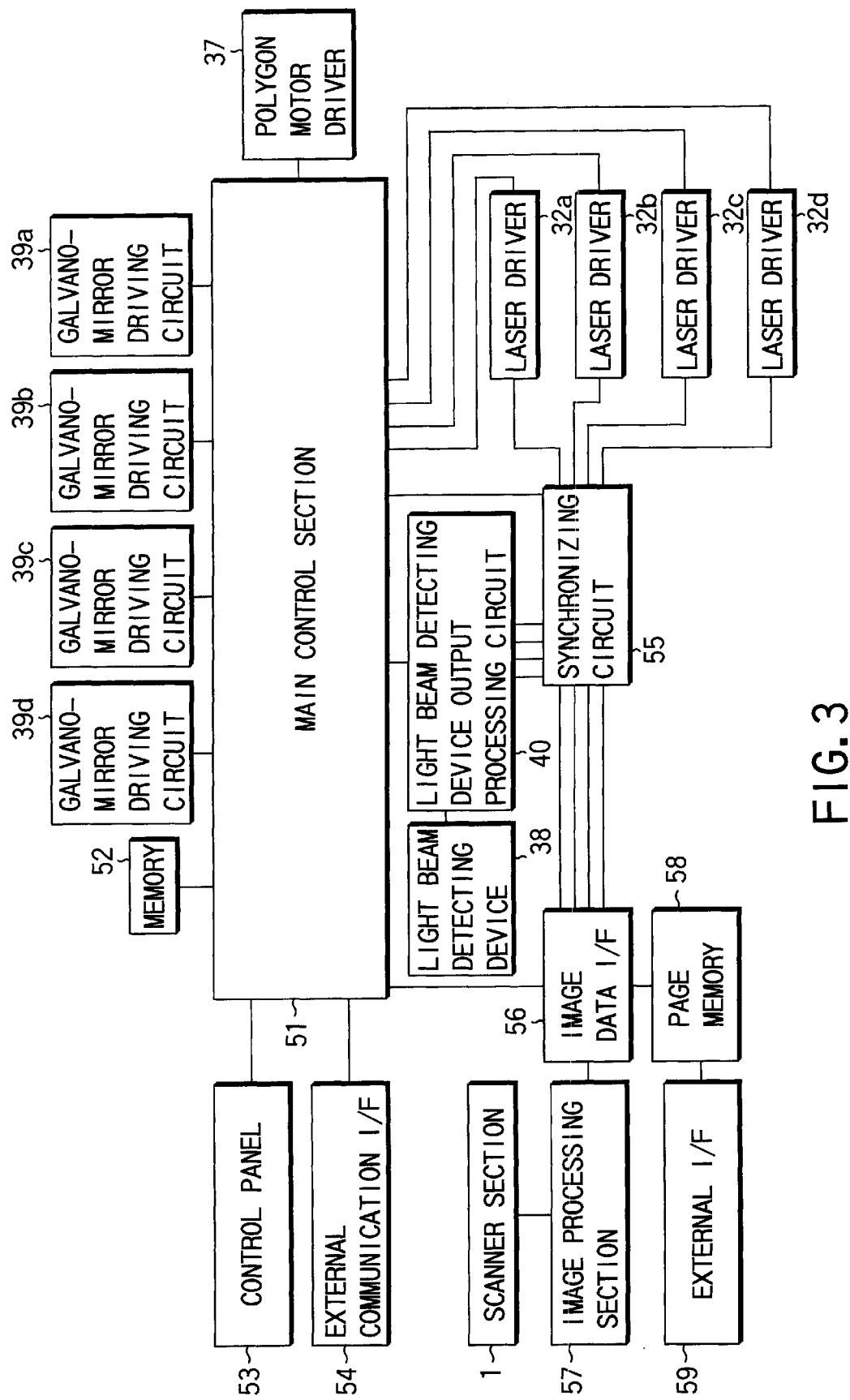
FIG. 3 is a diagram showing the control system including an optical system control section as a main portion.

Next, the control system is explained. FIG. 3 shows the control system mainly for controlling the multi-beam optical system. That is, 51 denotes a main control section for controlling the whole portion which is constructed by a CPU, for example, and to which a memory 52, control panel 53, external communication interface (I/F) 54, laser drivers 32a, 32b, 32c, 32d, polygon mirror motor driver 37, galvanomirror driving circuits 39b, 39c, 39d, light beam detecting device output processing circuit 40, synchronizing circuit 55 and image data interface (I/F) 56 are connected.

The image data I/F 56 is connected to the synchronizing circuit 55 and the image processing section 57 and page memory 58 are connected to the image data I/F 56. The scanner section 1 is connected to the image processing section 57 and the external interface (I/F) 59 is connected to the page memory 58.

Now, flow of image data when the image is formed is briefly explained below.

First, in the case of copying operation, an image of the original O set on the original table 7 is read by the scanner section 1 and fed to the image processing section 57 as described before. The image processing section 57 subjects the image signal from the scanner section 1 to the known shading correction process, various filtering processes, gradation process, gamma process and the like, for example.

Image data from the image processing section 57 is supplied to the image data I/F 56. The image data I/F 56 plays a role of distributing the image data to the four laser drivers 32a, 32b, 32c, 32d.

The synchronizing circuit 55 generates a clock synchronized with the timing at which each light beam passes on the light beam detecting device 38 and transmits image data as laser modulation signals from the image data I/F 56 to the respective laser drivers 32a, 32b, 32c, 32d in synchronism with the clock.

Thus, image formation synchronized in the main scanning direction (in the correct position) can be effected by transferring image data in synchronism with scanning of the respective light beams.

Further, the synchronizing circuit 55 includes a sample timer for forcedly causing the laser oscillators 31a, 31b, 31c, 31d to emit lights in a non-image area and controlling the powers of the light beams and a logic circuit for causing the laser oscillators 31a, 31b, 31c, 31d to emit lights on the light beam detecting device 38 in an order of the light beams in order to determine image forming timings of the respective light beams.

The control panel 53 is a man-machine interface for starting the copying operation and setting the number of sheets, for example.

The digital copying machine is constructed to effect not only the copying operation but also the image forming and outputting operation for forming and outputting image data input from the exterior via the external I/F 59 connected to the page memory 58. Image data input via the external I/F 59 is temporarily stored in the page memory 59 and then transmitted to the synchronizing circuit 55 via the image data I/F 56.

Further, if the digital copying machine is controlled from the exterior via a network, for example, the external communication I/F 54 plays a role of the control panel 53.

The galvanomirror driving circuits 39b, 39c, 39d are circuits for driving the galvanomirrors 33b, 33c, 33d according to instruction values from the main control section 51. Therefore, the main control section 51 can freely control the angles of the galvanomirrors 33b, 33c, 33d via the galvanomirror driving circuits 39b, 39c, 39d.

The polygon mirror driver 37 is a driver for driving the polygon motor 36 for rotating the polygon mirror 35 which scans the four light beams described before. The main control section 51 can cause the polygon motor driver 37 to start or stop the rotation and switch the rotation speed. Switching of the rotation speed can be effected in a case where the rotation speed is made lower than a preset rotation speed as required and a recording resolution is changed when the passage position of the light beam is confirmed by the light beam detecting device 38.

The laser drivers 32a, 32b, 32c, 32d have a function of forcedly causing the laser oscillators 31a, 31b, 31c, 31d to emit lights in response to a forced light emission signal from the main control section 51 irrespective of image data in addition to a function of causing the laser lights to be emitted according to the laser modulation signal synchronized with scanning of the light beam from the synchronizing circuit 55 as described before.

Further, the main control section 51 sets powers of light beams emitted from the laser oscillators 31a, 31b, 31c, 31d for the laser drivers 32a, 32b, 32c, 32d. The set value of the light emission power is changed according to a variation in the process condition and detection of the passage position of the light beam.

The memory 52 is to store information necessary for control. For example, the optical system unit 13 can be set into a state in which image formation can be instantly effected after turning ON the power supply by storing, for example, the control amount of each of the galvanomirrors 33b, 33c, 33d, the circuit characteristic (offset value of the amplifier) for detecting the passage position of the light beam, the order of incoming of the light beams and the like.

Next, the light beam detecting device 38 is explained.

Figure 4:
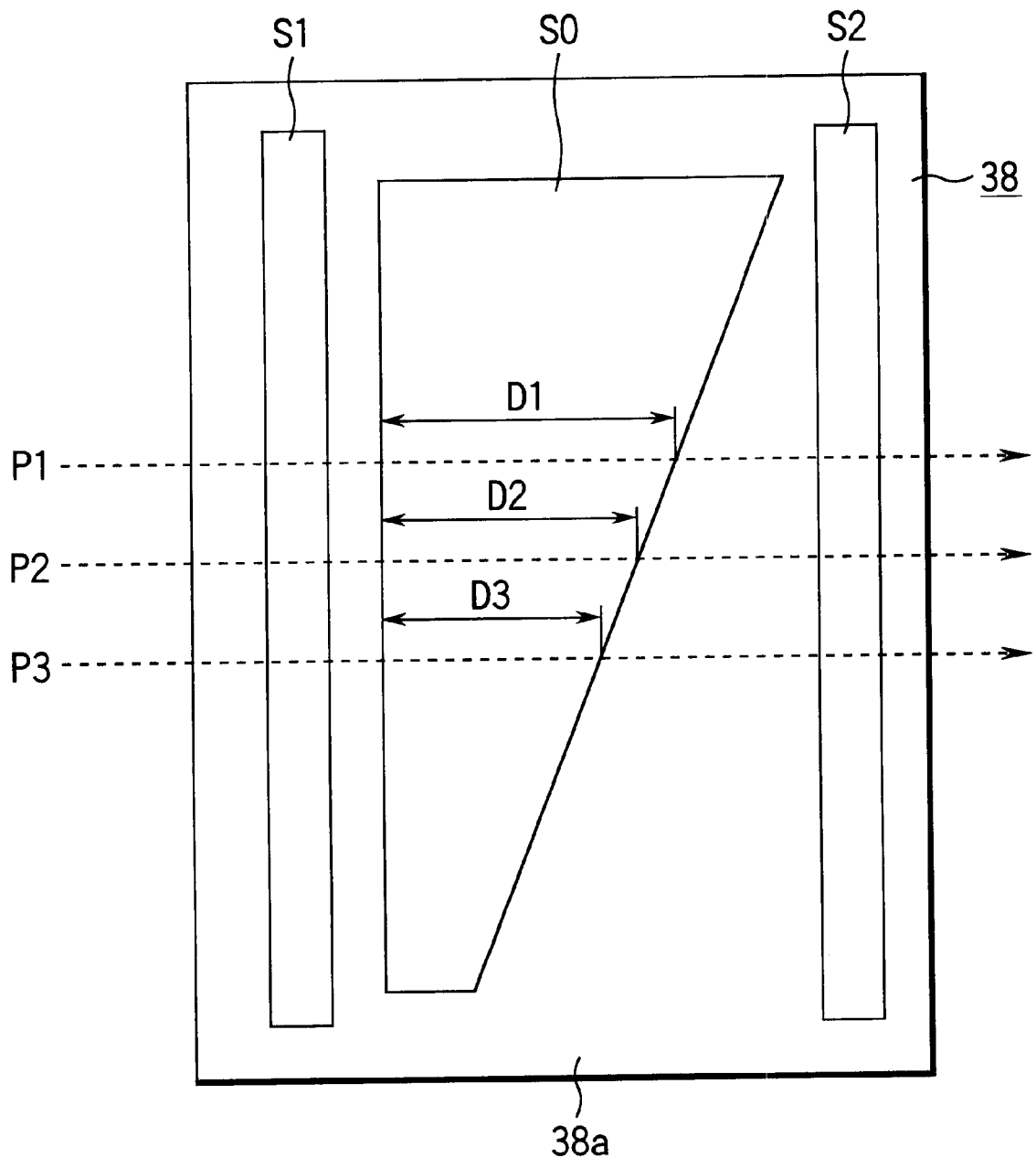
FIG. 4 is a structural view schematically showing the structure of a light beam detecting device.

FIG. 4 is a view showing the relation between the structure of the light beam detecting device 38 and the scanning direction of the light beam. Light beams from the four semiconductor laser oscillators 31a, 31b, 31c, 31d are scanned in the main scanning direction from the right to the left in the drawing by rotation of the polygon mirror 35 to cross the light beam detecting device 38.

The light beam detecting device 38 includes two sensor patterns S1, S2 which are long in the vertical direction, a sensor pattern S0 disposed between the two sensor patterns S1 and S2 and a holding base plate 38a for integrally holding the sensor patterns S1, S0, S2.

The sensor pattern S1 is a pattern for detecting passage of the light beam to generate a reset signal (integration starting signal) of an integrator as will be described later and the sensor pattern S2 is a pattern for detecting passage of the light beam to generate a conversion starting signal of an A/D converter as will be described later. The sensor pattern S0 is a pattern for detecting the passage position of the light beam and is formed to generate an output which is continuously changed with a variation in the passage position of the light beam.

As shown in FIG. 4, the sensor pattern S0 has such a shape that the distance by which the light beam crosses the sensor pattern S0 becomes longer as the passage position of the light beam becomes nearer to the upper side in FIG. 4. That is, if passage positions P1, P2, P3 of the light beams are taken as an example, the distances by which the light beams cross the sensor pattern S0 are D1, D2, D3 and the relation of D1>D2>D3 is obtained. Therefore, the period of signal outputting time of the sensor pattern S0 is changed according to the position through which the light beam passes.

For example, the sensor patterns S1, S2 are formed of photodiodes and integrally formed on the holding base plate 38a.

Figure 5:
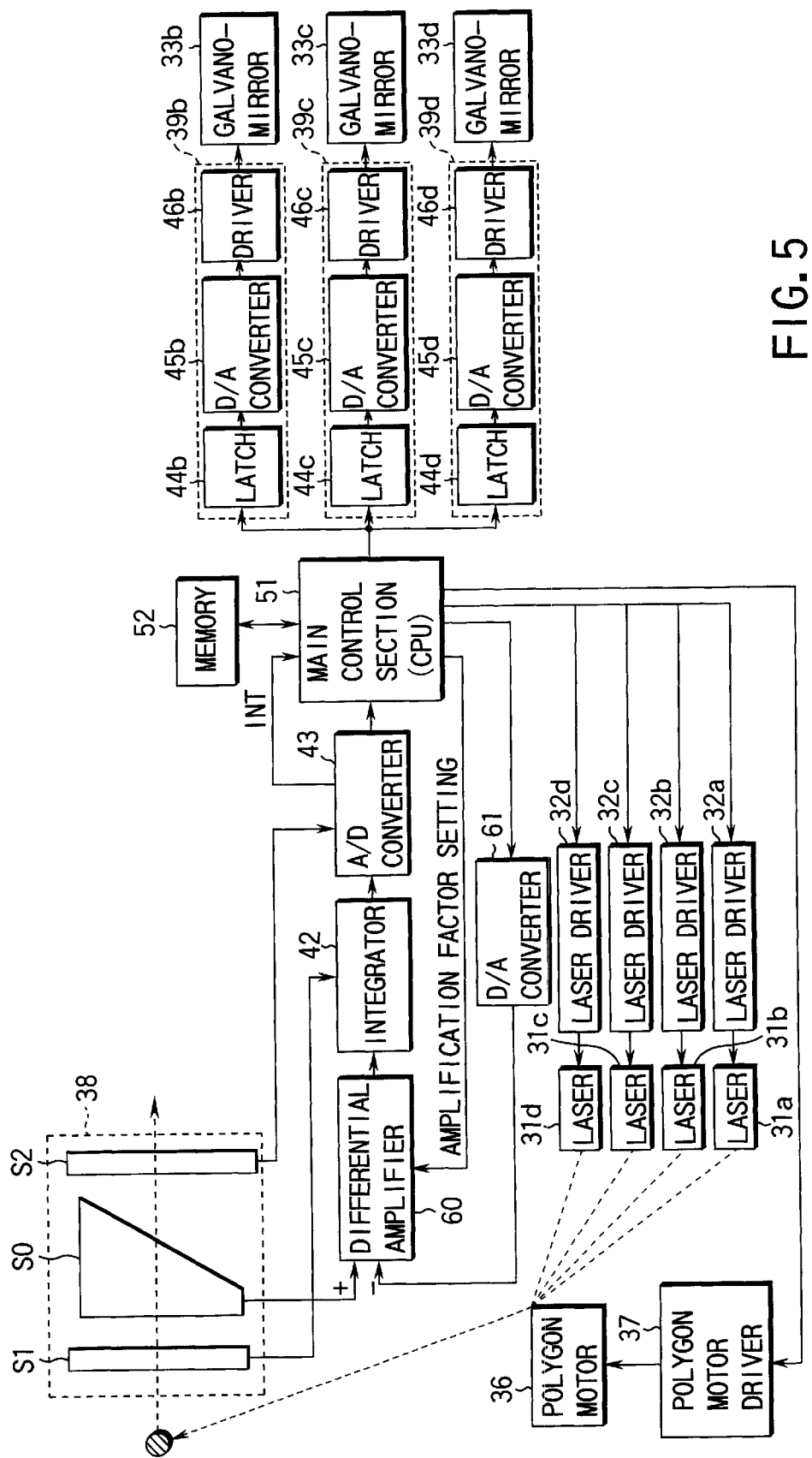
FIG. 5 is a block diagram showing the control system for illustrating a method for extracting passage position information of the light beam and controlling the galvanomirror based on an output from the light beam detecting device shown in FIG. 5.

FIG. 5 is a block diagram showing the construction of a device for extracting light beam passage position information based on outputs from the sensor patterns S1, S0, S2 shown in FIG. 4 and controlling the galvanomirrors.

As described before, pulse-form signals indicating that the light beams have passed are output from the sensor patterns S1, S0, S2. Further, a signal whose period of output time is changed with a variation in the light beam passage position (position in the sub-scanning direction) is output from the sensor pattern S0.

An output signal of the sensor pattern S0 is input to the non-inverting input terminal (+) of a differential amplifier 60. The inverting input terminal (−) of the differential amplifier 60 is supplied with an output of a D/A converter 61. The amplification factor of the differential amplifier 60 can be set by the main control section (CPU) 51.

The D/A converter 61 converts a digital signal from the main control section 51 into an analog signal. That is, the differential amplifier 60 amplifies a difference between a set value input from the main control section 51 via the D/A converter 61 and an output of the sensor pattern S0 with an amplification factor set by the main control section 51.

An output signal of the differential amplifier 60 is input to and integrated by an integrator 42 used as integrating means. A pulse-form signal output from the sensor pattern Si is also input to the integrator 42. The pulse-form signal from the sensor pattern S1 is used as a reset signal (integration starting signal) for resetting the integrator 42, and at the same time, starting the new integrating operation. Therefore, the integrator 42 is reset and starts to newly integrate the output signal from the sensor pattern S0 when the light beam passes on or crosses the sensor pattern S1.

An output signal of the integrator 42 is input to an A/D converter 43 used as converting means. A pulse-form signal output from the sensor pattern S2 is also input to the A/D converter 43. The A/D converter 43 is triggered by the pulse-form signal output from the sensor pattern S2 to A/D convert the output signal of the integrator 42.

That is, the A/D converter 43 converts the output signal of the integrator 42 into digital data when the light beam reaches the sensor pattern S2 after passing on the sensor pattern S0 and supplies the digital data to the main control section 51. When the A/D converting operation is terminated, the A/D converter 43 outputs an interrupt signal (INT) indicating that the A/D converting operation is terminated to the main control section 51.

When receiving the interrupt signal from the A/D converter 43, the main control section 51 reads the output of the A/D converter 43 to obtain the newest light beam passage position information.

Then, the main control section 51 calculates the control amounts of the galvanomirrors 33b, 33c, 33d based on the thus obtained light beam passage position information, stores the result of calculation into the memory 52 if necessary and supplies the result of calculation to the galvanomirror driving circuits 39b, 39c, 39d.

As shown in FIG. 5, latches 44b, 44c, 44d for holding data of the result of calculation are provided in the galvanomirror driving circuits 39b, 39c, 39d. If the latches 44b, 44c, 44d fetch data from the main control section 51, they hold the data until the data is updated.

Data items held in the latches 44b, 44c, 44d are converted into analog signals (voltages) by D/A converters 45b, 45c, 45d and input to galvanomirror drivers 46b, 46c, 46d. The drivers 46b, 46c, 46d drive the galvanomirrors 33b, 33c, 33d according to the voltage signals input from the D/A converters 45b, 45c, 45d.

Therefore, in this embodiment, the light beam passage positions can be controlled by operating the semiconductor laser oscillators for emitting light beams whose passage positions are desired to be controlled, reading the output of the A/D converter 43 and controlling the galvanomirrors 33b, 33c, 33d based on read information.

Figure 6:
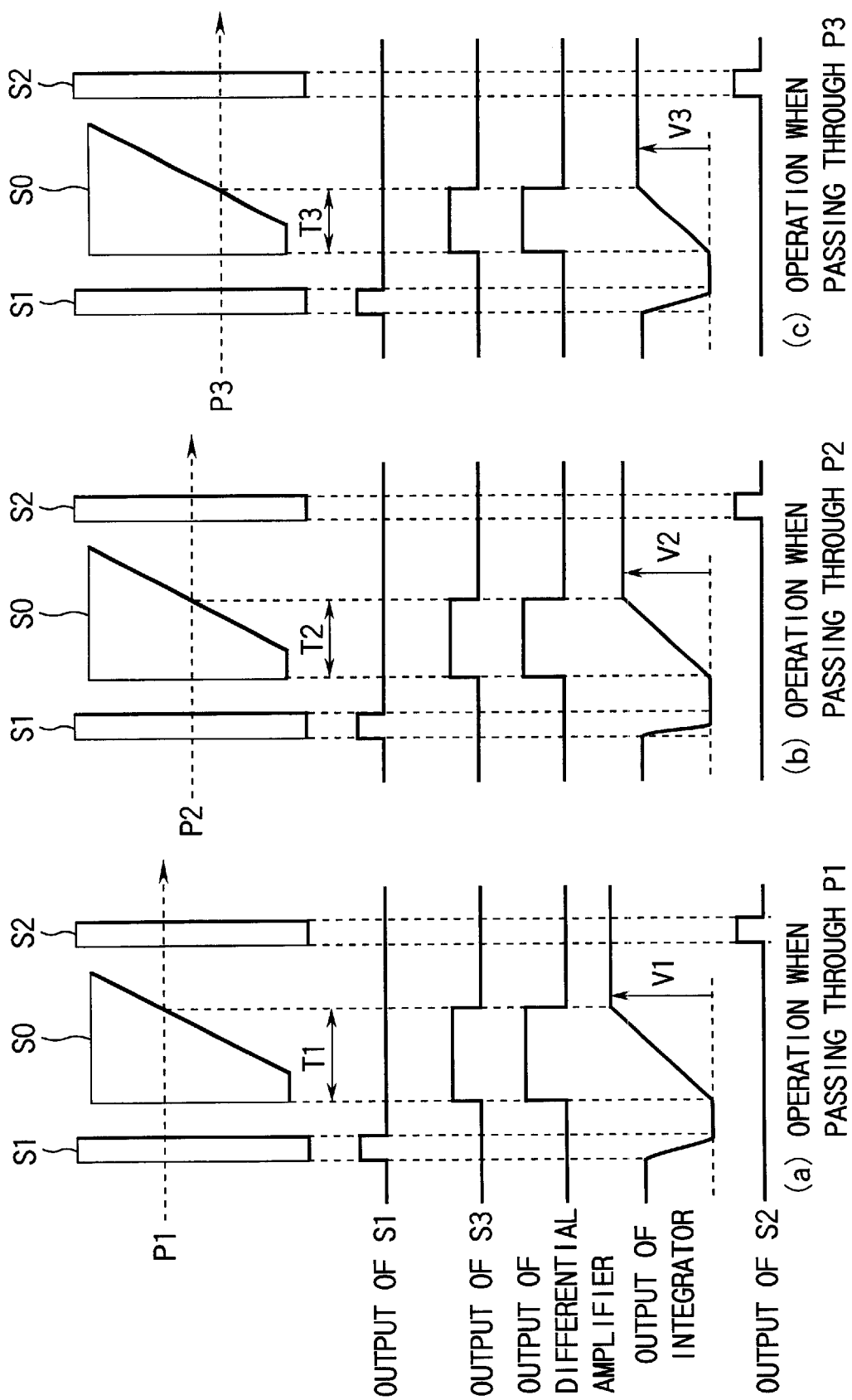
FIGS. 6A to 6C are diagram showing the relation between the passage position of the light beam, outputs of the sensor patterns of the light beam detecting device, an output of a differential amplifier, and an output of an integrator.

Next, the operation of each section, that is, the state in which the light beam passage position information is extracted when the light beam passes through the passage positions P1, P2, P3 is explained with reference to FIG. 6. In this case, in order to clarify the explanation, FIG. 6 shows a case wherein a set value into the D/A converter 61 is "0". By setting the set value in the D/A converter 61 to "0", the differential amplifier 60 can be dealt with as a simple amplifier. The role of the D/A converter 61 is explained later.

FIG. 6A shows the operation when the light beam passes through the position P1, FIG. 6B shows the operation when the light beam passes through the position P2 and FIG. 6C shows the operation when the light beam passes through the position P3.

When the light beam passes on the sensor pattern S1, the sensor pattern S1 outputs a pulse-form signal, the integrator 42 is reset in response to the pulse-form signal as shown in FIG. 6A and the output thereof is set to "0". When the light beam reaches the sensor pattern S0, an output signal is generated from the sensor pattern S0 and a signal obtained by amplifying the output signal is output from the differential amplifier 60.

As shown in FIG. 6A, in the case of the light beam P1, the differential amplifier 60 outputs a positive signal in a period of time T1. The integrator 42 integrates the output signal and outputs an output voltage V1. As shown in FIG. 6B, in the case of the light beam P2, the differential amplifier 60 outputs a positive signal in a period of time T2. As shown in FIG. 6C, in the case of the light beam P3, the differential amplifier 60 outputs a positive signal in a period of time T3. Therefore, the output voltages of the integrator 42 for the light beams P2 and P3 are set to voltages V2 and V3 corresponding to the integration periods of time.

As described before, the time periods T1 to T3 during which the light beam passes on the sensor pattern S0 are different depending on the position (P1, P2, P3) in which the light beam passes on the sensor pattern S0. Since the passage time periods have the relation of T1>T2>T3, the output voltages V1 to V3 of the integrator 42 corresponding to the respective light beams have the relation of V1>V2>V3.

Further, when the light beam passes on the sensor pattern S2, a pulse-form signal is output from the sensor pattern S2 and the A/D converter 43 converts the voltage values V1 to V3 to corresponding digital values.

The main control section 51 can roughly detect the position where the light passes on the sensor pattern S0 by reading the digital values output from the A/D converter 43.

Figure 7:
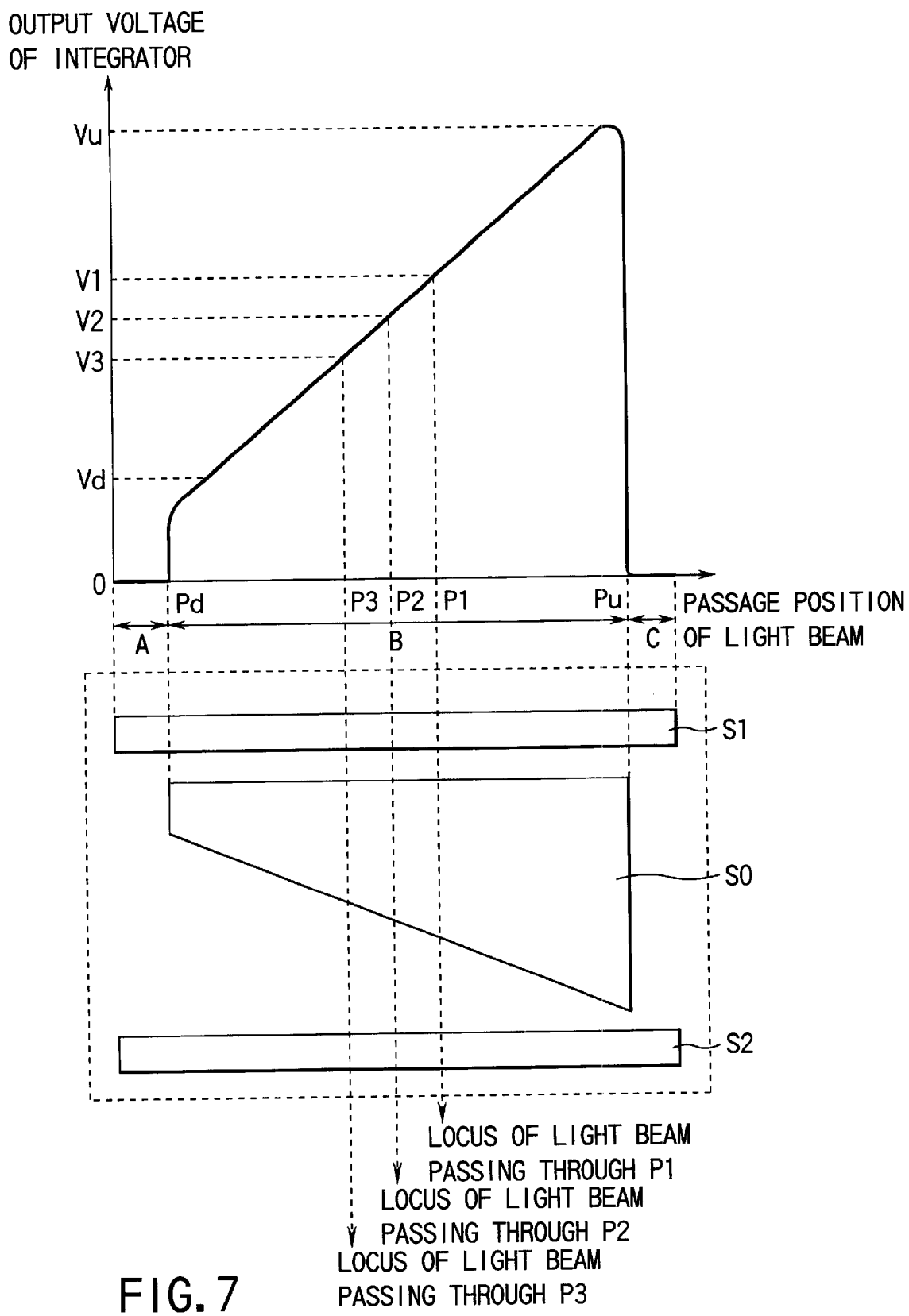
FIG. 7 is a graph showing the relation between the passage position of the light beam and an output voltage of the integrator.

FIG. 7 is a graph showing the relation between the light beam passage position and the output voltage of the integrator 42 obtained as described above. The abscissa indicates the light beam passage position and the ordinate indicates the output voltage of the integrator 42.

Areas A and C indicates areas in which the light beam does not pass on the sensor pattern S0 (the light beam passes along while it is deviated from the sensor pattern in the upward or downward direction). Since the sensor pattern S0 does not output a signal in the above areas, the output of the integrator 42 is "0".

An area B is an area in which the light beam passes on the sensor pattern S0. It is understood that the output of the integrator 42 varies in proportion to a variation in the passage position of the light beam when the light beam stably passes on or crosses the sensor pattern S0 except a case wherein the light beam passes through the edge portion of the sensor pattern S0.

Therefore, as described before, the main control section 51 can roughly detect the position of the sensor pattern S0 on which the light beam passes by reading the result of A/D-conversion of the output of the integrator 42.

As described above, the main control section 51 can detect the passage position of the light beam, but in order to enhance the precision of detection, it is required for the A/D converter 43 to have high resolution. For example, a case wherein the distance of the area B is 2048 $\mu$m and the potential difference between Vu and Vd of FIG. 7 is A/D-converted by an 8-bit A/D converter is assumed. In this case, the resolution (precision of detection) becomes 8 $\mu$m (=2048 $\mu$m/256). If a 12-bit A/D converter is used in order to further enhance the precision of detection, the resolution (precision of detection) is enhanced to 0.5 $\mu$m (=2048 $\mu$m/4096). However, if the 12-bit A/D converter is used, the cost becomes extremely high.

For example, if a case wherein it is desired to detect only the passage positions P1, P2, P3 with high precision is considered, it is not efficient to detect the whole area (2048 $\mu$m) of the area B with high resolution.

Figure 8:
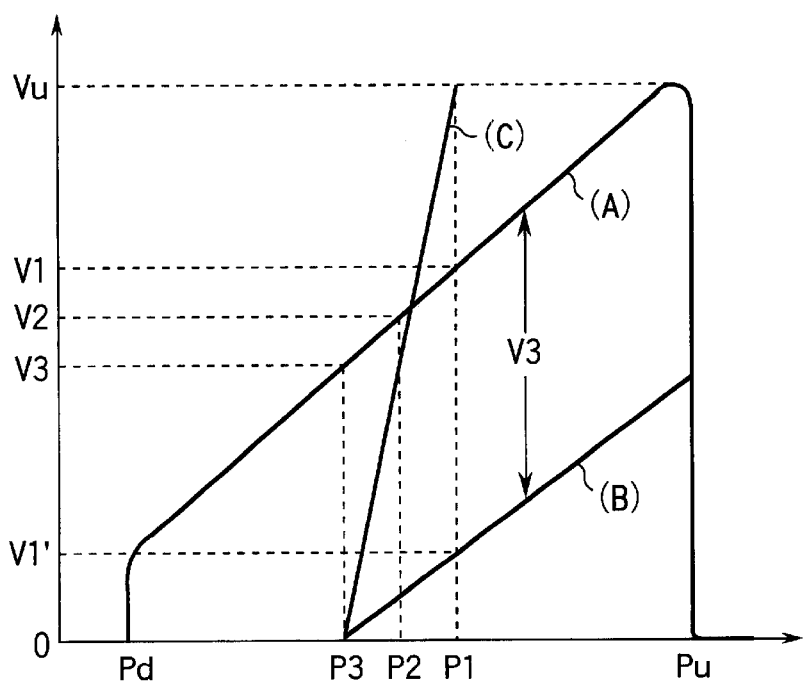
FIG. 8 is a graph for illustrating a method for detecting the passage position of the light beam with high resolution set for a necessary portion.

Therefore, a method for detecting the passage position of the light beam with high resolution only in a necessary region is explained with reference to FIG. 8.

First, the main control section 51 outputs digital data corresponding to the voltage V3 to the D/A converter 61 shown in FIG. 5. Since the output of the D/A converter 61 is input to the inverting input terminal of the differential amplifier 60, the differential amplifier 60 outputs a voltage obtained by subtracting the output voltage of the D/A converter 61 from the output of the sensor pattern S0.

When the light beam passes through the passage position P3, the output of the integrator 42 becomes "0". In other words, the main control section 51 outputs a value which causes the output of the integrator 42 to become "0" when the light beam passes through the passage position P3 to the D/A converter 61.

When the light beam passes through the passage position P1, the output V1 is lowered by V3 and becomes V1'. That is, the output of the integrator 42 is shifted downwardly (towards the low voltage side) by the voltage V3 as shown by (B). Next, the main control section 51 raises the amplification factor of the differential amplifier 60. For example, it raises the amplification factor to such a value that the output voltage thereof in the passage position P1 will become Vu as shown by (C).

Thus, the voltage variation (range) when the passage position of the light beam is changed from P1 to P3 can be made large and it becomes possible to enhance the detection resolution (precision) without enhancing the resolution of the A/D converter 43.

The principle of detecting the passage position of the light beam in a wide range and the principle of enhancing the precision of detection are explained.

Figure 9:
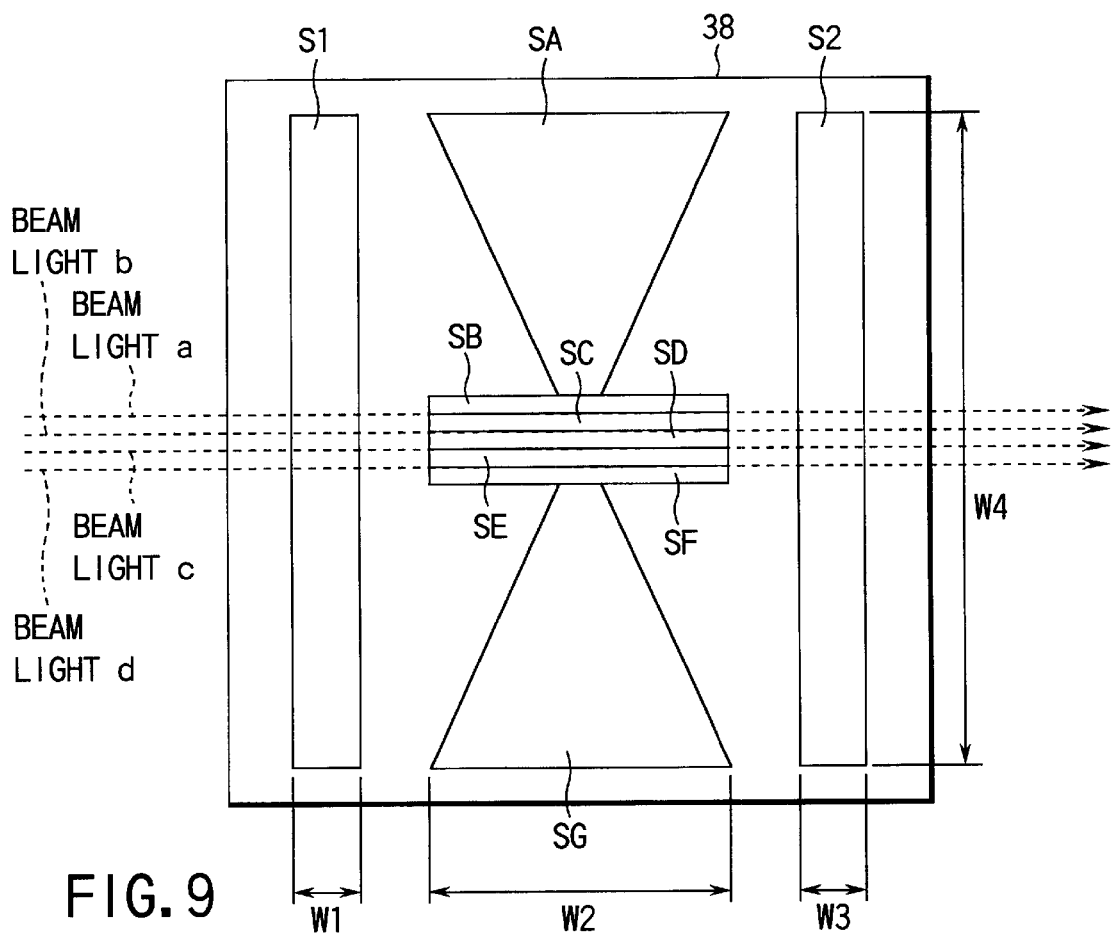
FIG. 9 is a structural view schematically showing another example of the structure of the light beam detecting device.

Next, an example in which the conventional light beam passage position detecting method is improved by use of the above principles is explained. FIG. 9 shows an example obtained by improving the sensor pattern of the light beam detecting device 38 disclosed in Japanese Pat. Appln. KOKAI Publication No. 10-76704 by use of the principle of this invention explained so far.

That is, the light beam detecting device 38 includes two sensor patterns S1, S2 which are long in the vertical direction, seven sensor patterns SA to SG disposed between the two sensor patterns S1 and S2 and a holding base plate 38a for integrally holding the sensor patterns S1, S2, SA to SG. For example, the sensor patterns S1, S2, SA to SG are formed of photodiodes.

The sensor pattern S1 is a pattern for detecting passage of the light beam to generate a reset signal (integration starting signal) of the integrator 42 and the sensor pattern S2 is a pattern for detecting passage of the light beam to generate a conversion starting signal of the A/D converter 43. The sensor patterns SA to SG are patterns for detecting the passage position of the light beam.

As shown in FIG. 9, the sensor patterns S1, S2 are formed to be long in the sub-scanning direction of the light beam (in a direction perpendicular to the main scanning direction) so that the light beams a to d scanned by the polygon mirror 35 will cross the sensor pattern without fail irrespective of the position of the galvanomirror 33b to 33d. For example, in this example, the widths W1, W3 of the sensor patterns S1, S2 in the main scanning direction of the light beam are 200 $\mu$m and the length W4 thereof in the sub-scanning direction of the light beam is 200 $\mu$m.

As shown in FIG. 9, the sensor patterns SA to SG are disposed in a laminated form in the sub-scanning direction between the sensor patterns S1 and S2 and the total length thereof is set to the same as the length W4 of the sensor patterns S1, S2. The width W2 of the sensor patterns SA to SG in the main scanning direction is set to 600 $\mu$m, for example.

The sensor pattern SA which lies in the upper portion in the drawing is formed in a trapezoidal form in which the size thereof in the main scanning direction is large in the upper portion and becomes smaller in a portion nearer to the sensor central portion. On the other hand, the sensor pattern SG which lies in the lower portion in the drawing is formed in a trapezoidal form in which the size thereof in the main scanning direction is smaller in a portion nearer to the sensor central portion and becomes larger in a portion nearer to the lower side.

With the above structure, in a range in which the sensor patterns detect the passage of the light beam, the signal outputting time of the sensor pattern SA becomes shorter as the passage position of the light beam becomes lower and the signal outputting time of the sensor pattern SG becomes longer as the passage position of the light beam becomes lower.

Therefore, even if the passage position of the light beam is greatly deviated from the detection range of the sensor patterns SB to SF, the degree of deviation can be easily detected.

Next, an example in which the principle of this invention is applied to detection of inclination of the light beam detecting device 38 with respect to the main scanning direction of the light beam is explained.

Figure 10:
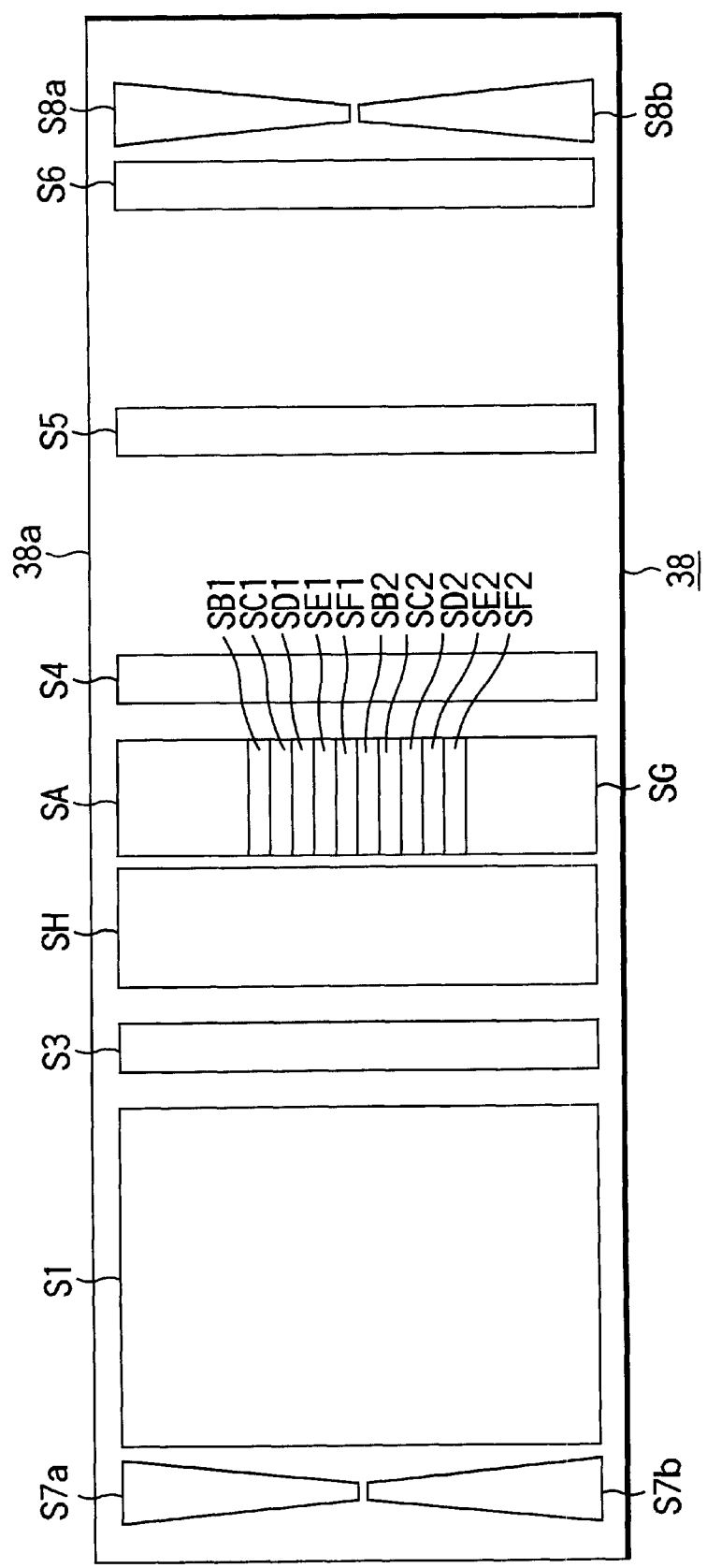
FIG. 10 is a structural view schematically showing still another example of the structure of the light beam detecting device.

FIG. 10 shows an example obtained by improving the sensor pattern of the light beam detecting device 38 disclosed in Japanese Pat. Appln. KOKAI Publication No. 9-314901 by use of the principle of this invention explained so far. That is, the light beam detecting device 38 includes sensor patterns S7a, S7b, S1, S3, SH, SA, SB1 to SF1, SB2 to SF2, SG, S4, S5, S6, S8a, S8b which are sequentially disposed from the left in the drawing on a holding base plate 38a.

The sensor patterns SA, SB1 to SF1, SB2 to SF2, SG are patterns for detecting the passage position of the light beam, the sensor patterns SB1 to SF1 are used for detection with first resolution (for example, 600 dpi) and the sensor patterns SB2 to SF2 are used for detection with second resolution (for example, 400 dpi).

The sensor pattern SH is a pattern for detecting the power of the light beam. The sensor patterns S4, S5, S6 are patterns for detecting passage timing of the light beam. The sensor pattern S6 also has a function of the sensor pattern S2.

The sensor patterns S7a, S7b, S8a, S8b are patterns for detecting the inclination. The sensor patterns S7a, S7b and S8a, S8b are arranged in the upper and lower positions to make pairs and the centers between the sensor patterns S7a and S7b and the sensor patterns S8a and S8b are set in alignment with the centers of the other sensor patterns such as the sensor patterns S1, S3.

The principle of this invention is applied to the sensor patterns S7a, S7b, S8a, S8b and the upper and lower sensor patterns S7a and S7b and the upper and lower sensor patterns S8a and S8b which make pairs are respectively formed in inverted tapered forms.

With the above structure, by comparing the outputs of the sensor patterns S7a and S7b and comparing the outputs of the sensor patterns S8a and S8b, the mounting inclination of the light beam detecting device 38 with respect to the scanning direction of the light beam can be detected.

With the above structure, since the outputs of the sensor patterns S7a, S7b, S8a, S8b are continuously changed with a variation in the passage position of the light beam in a wide range, the inclination can be detected in a wide range.

Figure 11:
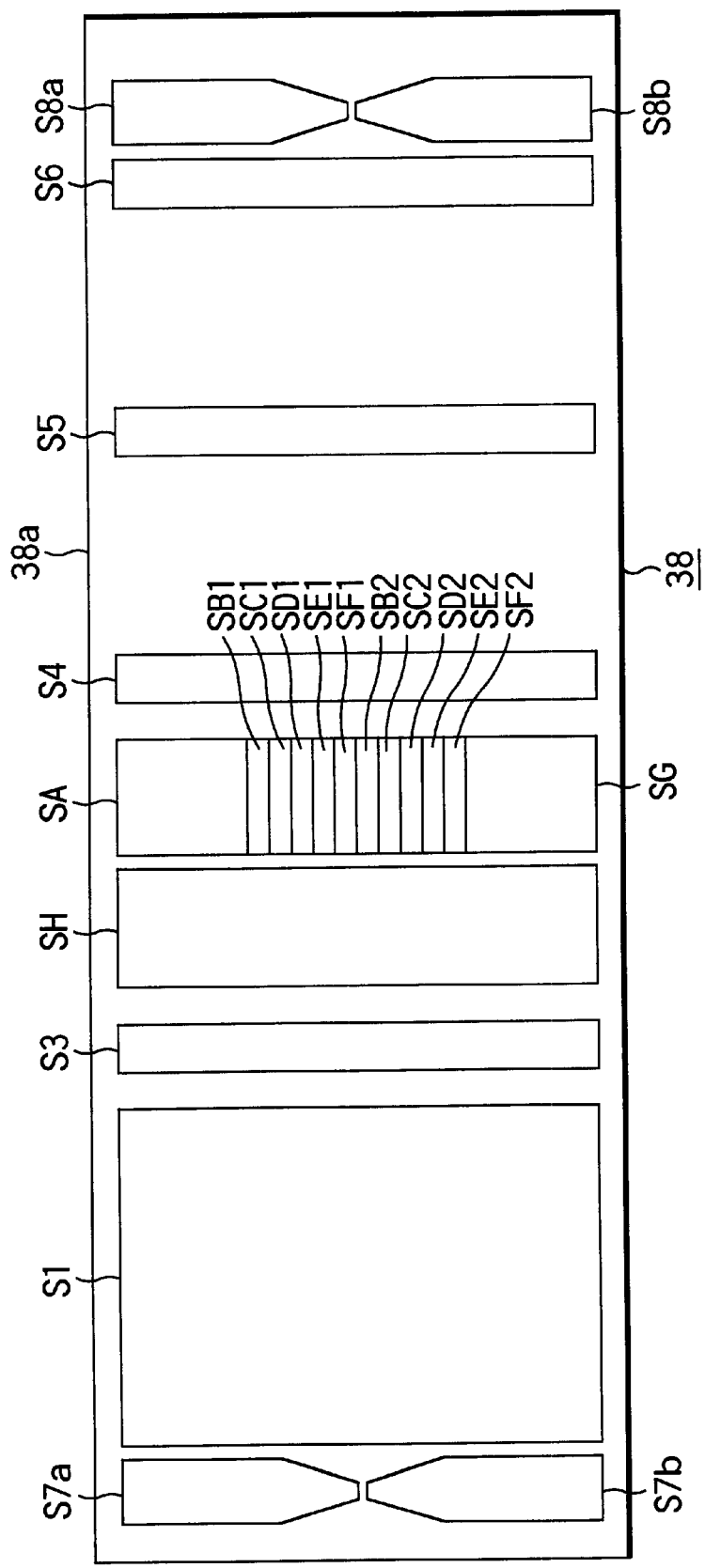
FIG. 11 is a structural view schematically showing another example of the structure of the light beam detecting device.

FIG. 11 shows an example in which the sensitivity to the inclination is raised in comparison with the case of FIG. 10. The upper and lower sensor patterns S7a and S7b and the upper and lower sensor patterns S8a and S8b which make pairs are respectively formed in inverted tapered forms, but the range of the tapered portion is narrower than in the case of FIG. 10 (the inclination of the tapered portion is steeper) and the sensitivity for detection of inclination is raised accordingly. In the normal mounting adjustment, the sufficiently wide range and high sensitivity can be attained with the above structure.

Figure 12:
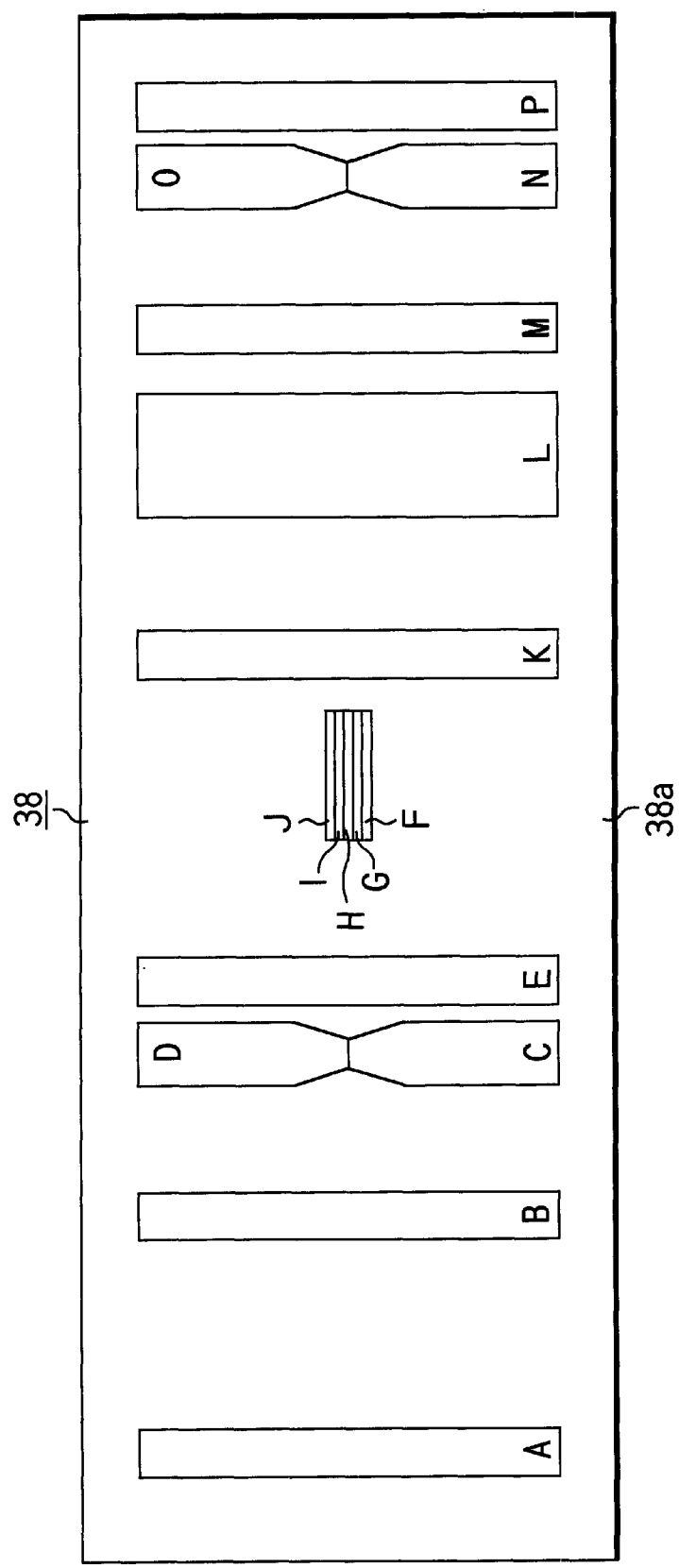
FIG. 12 is a structural view schematically showing another example of the structure of the light beam detecting device.

The inclination detecting sensor patterns shown in FIGS. 10, 11 can be used not only for detection of inclination but also for detection of the passage position of the light beam in the sub-scanning direction as explained before with reference to FIG. 9. In FIGS. 10, 11, the sensor pattern for outputting the signal pulse for starting A/D conversion and the sensor pattern for resetting the integrator as explained before are not shown. FIG. 12 shows an example of the light beam detecting device 38 including sensor patterns having the above functions. The light beam detecting device 38 is explained below.

Two pulse signals of different timings are output when the light beam passes on the patterns of A and B of FIG. 12. A reset signal (corresponding to the pulse signal from the sensor pattern S1) for the integrator is created based on the two pulse signals. That is, a pulse signal which is defined by the rising edge of an output of the sensor pattern A and the falling edge of an output of the sensor pattern B is created by a logic circuit and input to the integrator as a reset signal.

The reason why the reset signal is thus created by use of the two sensor patterns is that resetting of the integrator requires a relatively long time (which is approximately equal to time during which the light beam passes along between A and B). Another reason is that the rise of the signal output of the sensor pattern is generally steep and the fall thereof is gentle and it is desirable to use the rise timing of the output of the sensor pattern if the precise timing is obtained.

The sensor pattern E is a pattern for outputting an A/D conversion start timing signal (corresponding to the output of the sensor pattern S2). Therefore, the sensor patterns A, B correspond to the sensor pattern S1 whose principle is explained before and the sensor pattern E corresponds to the sensor pattern S2. Further, the sensor patterns C, D correspond to the sensor pattern S0 whose principle is explained before and the sensor patterns S7a, S7b shown in FIGS. 10, 11.

Likewise, the sensor patterns K, M correspond to the sensor patterns A, B, that is, the sensor pattern S1 whose principle is explained before and the sensor pattern P corresponds to the sensor pattern S2. Further, the sensor patterns O, N correspond to the sensor pattern S0 whose principle is explained before and the sensor patterns S8a, S8b shown in FIGS. 10, 11.

Likewise, in a case where the power detection is effected, the sensor patterns E, K correspond to the sensor patterns A, B, that is, the sensor pattern S1 whose principle is explained before and the sensor pattern M corresponds to the sensor pattern S2. Further, the sensor pattern L for detecting the power corresponds to the sensor pattern S0 whose principle is explained before.

Figure 13:
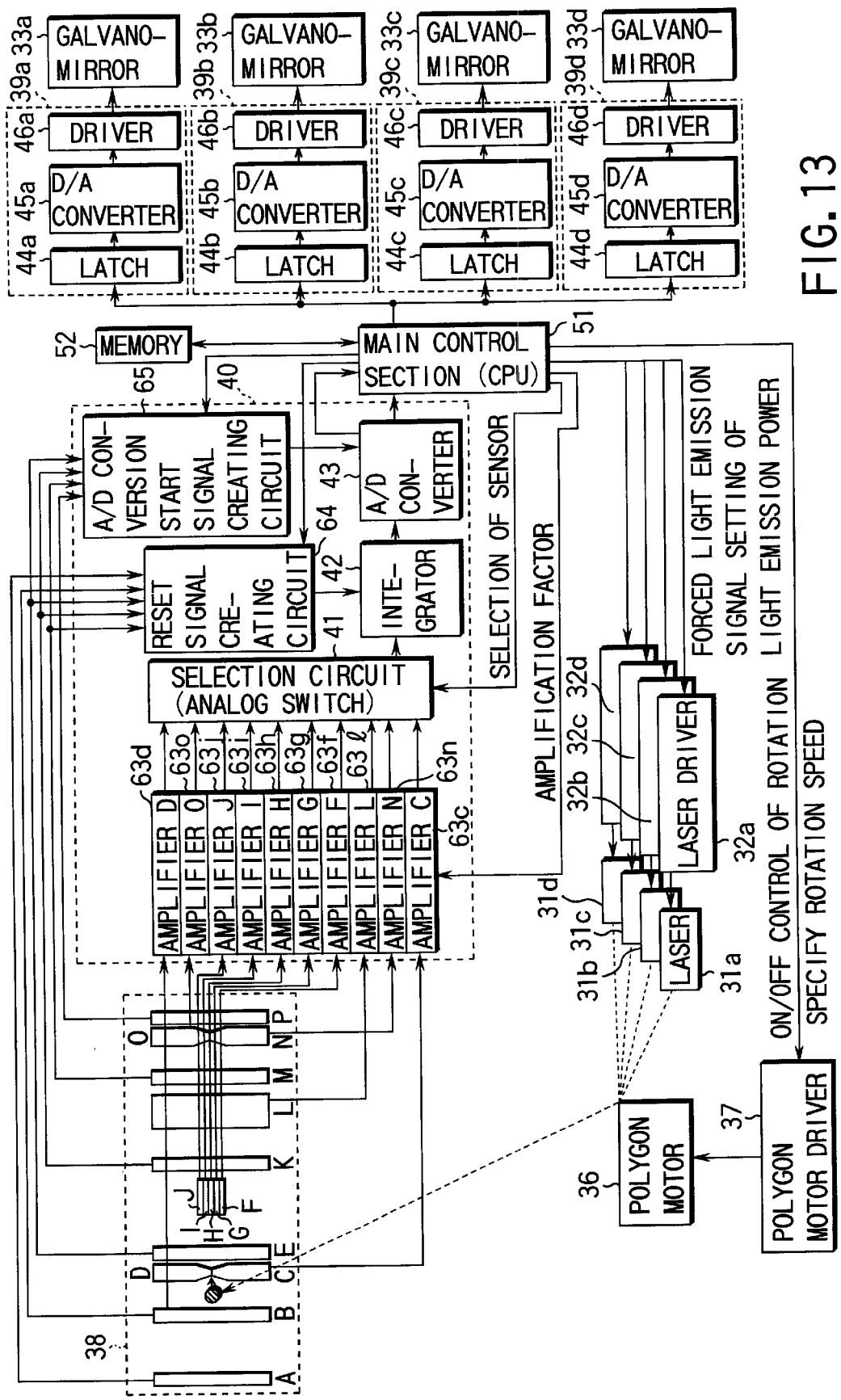
FIG. 13 is a block diagram of a control system for illustrating the light beam passage position control process using the light beam detecting device of FIG. 12.

FIG. 13 is a diagram for illustrating control of the light beam passage position when the light beam detecting device shown in FIG. 12 is used and a portion associated with light beam control is extracted from the block diagram of FIG. 3 and shown in detail.

As described before, if the light beam detecting device 38 shown in FIG. 12 is used, four functions, that is, an inclination detecting function in a wide range, rough light beam passage position detecting function, precise light beam passage position detecting function and power detecting function can be realized.

That is, the sensor patterns C, D, N, O are used for the inclination detecting function in a wide range, the sensor patterns C, D or the sensor patterns N, O are used for the rough light beam passage position detecting function, the sensor patterns F, G, H, I, J are used for the precise light beam passage position detecting function and the sensor pattern L is used for the power detecting function.

The outputs of the sensor patterns C, D, N, O, F, G, H, I, J, L are respectively amplified by amplifiers 63c, 63d, 63n, 63o, 63f, 63g, 63h, 63i, 63j, 63l and input to a selection circuit (analog switch) 41. The amplification factors of the respective amplifiers 63c, 63d, 63n, 63o, 63f, 63g, 63h, 63i, 63j, 63l are set by the main control section 51.

The selection circuit 41 selects a signal input to the integrator 42 according to the sensor selection signal from the main control section 51 and the selected signal is input to and integrated by the integrator.

In FIG. 13, the D/A converter 61 shown in FIG. 5 is not shown. As will be described later, this is because it is not necessary to electrically switch the precision since the patterns F, G, H, I, J for precisely detecting the light beam passage position and the patterns C, D, N, O for detecting the light beam passage position in a wide range are separately provided as the sensor patterns.

In the block diagram of FIG. 13, it is necessary to change the timings of the reset signal (integration start signal) and the A/D conversion start signal according to the sensor pattern to be detected since the integrator 42 and A/D converter 43 are commonly used. This is made possible by use of a reset signal creating circuit 64 and A/D conversion start signal creating circuit 65.

The outputs of the sensor patterns A, B, E, K, M are input to the reset signal creating circuit 64. As explained before, the reset signal for the integrator 42 is created by use of two signals among the above outputs and input to the integrator 42. A method for creating the reset signal by combining what type of signals is determined by the main control section 51.

Further, the outputs of the sensor patterns E, K, M, P are input to the A/D conversion start signal creating circuit 65 and the main control section 51 can select an adequate signal.

That is, the main control section 51 can selectively determine the outputs of the sensor patterns which are combined to create the reset signal and the output of the sensor pattern which is used as the conversion start signal for the circuits 64, 65 according to the sensor pattern to be detected.

The sensor patterns to be detected and settings for the circuits 64, 65 are indicated in the following table 1.

TABLE 1

| No. | detection items | to-be-detected objects | reset (leading edge-trailing edge) | A/D conversion Start |
|---|---|---|---|---|
| 1 | inclination, passage position | C, D | A–B | E |
| 2 | Passage position | F, G, I, J | B–E | K |
| 3 | Power | L | E–K | M |
| 4 | Inclination, passage position | N, O | K–M | P |

Thus, the main control section 51 adequately selects the to-be-detected sensor pattern, effects the integrating operation and A/D converting operation in the optimum state and can fetch information as digital data.

The main control section 51 realizes the four functions of detecting the inclination of the light beam detecting device 38 and roughly detecting the light beam passage position based on both of the detection items of No. 1 and No. 4 in the table 1, precisely detecting the light beam passage position based on the detection items of No. 1 and No. 2 in the table 1, and detecting the power based on the detection items of No. 1 and No. 3 in the table 1.

The operations of the amplifiers 63c, 63d, 63n, 63o, 63f, 63g, 63h, 63i, 63j, 63l, integrator 42 and A/D converter 43 are the same as explained with reference to FIG. 5 and the explanation for the operations is omitted here.

In FIG. 13, four sets of galvanomirrors and galvanomirror driving circuits for driving the galvanomirrors are shown and the number of sets is larger than the number of sets of galvanomirrors and galvanomirror driving circuits shown in FIGS. 2 and 5 by one.

This is because a case wherein the light beam passage position detecting method of this invention is applied to the conventional light beam passage position detecting device and all of the light beam passage positions are required to be controlled by the control method described in Japanese Pat. Appln. KOKAI Publication No. 10-76704, for example.

Therefore, in this example, it is impossible to attain one of the objects of this invention, that is, to suppress to a least sufficient number the number of actuators for permitting the relative passage position of the light beam to be detected in a wide range and controlling the passage position of the light beam (for example, to suppress the four actuators in the conventional case to three). However, as described above, the inclination detecting range advantageous for adjustment of the mounting inclination of the light beam detecting device can be made wider in comparison with the conventional case and the rough light beam passage position detecting function suitable for rough adjustment of the light beam passage position can be attained.

The construction of the optical system unit (corresponding to FIG. 2) used in this case is described in detail in Japanese Pat. Appln. KOKAI Publication No. 10-76704, for example, and the explanation therefore is omitted here.

Next, the outputs of the sensor patterns relating to the detection items of No. 1, No. 2, No. 4 in the above table 1 are explained in detail below.

Figure 14:
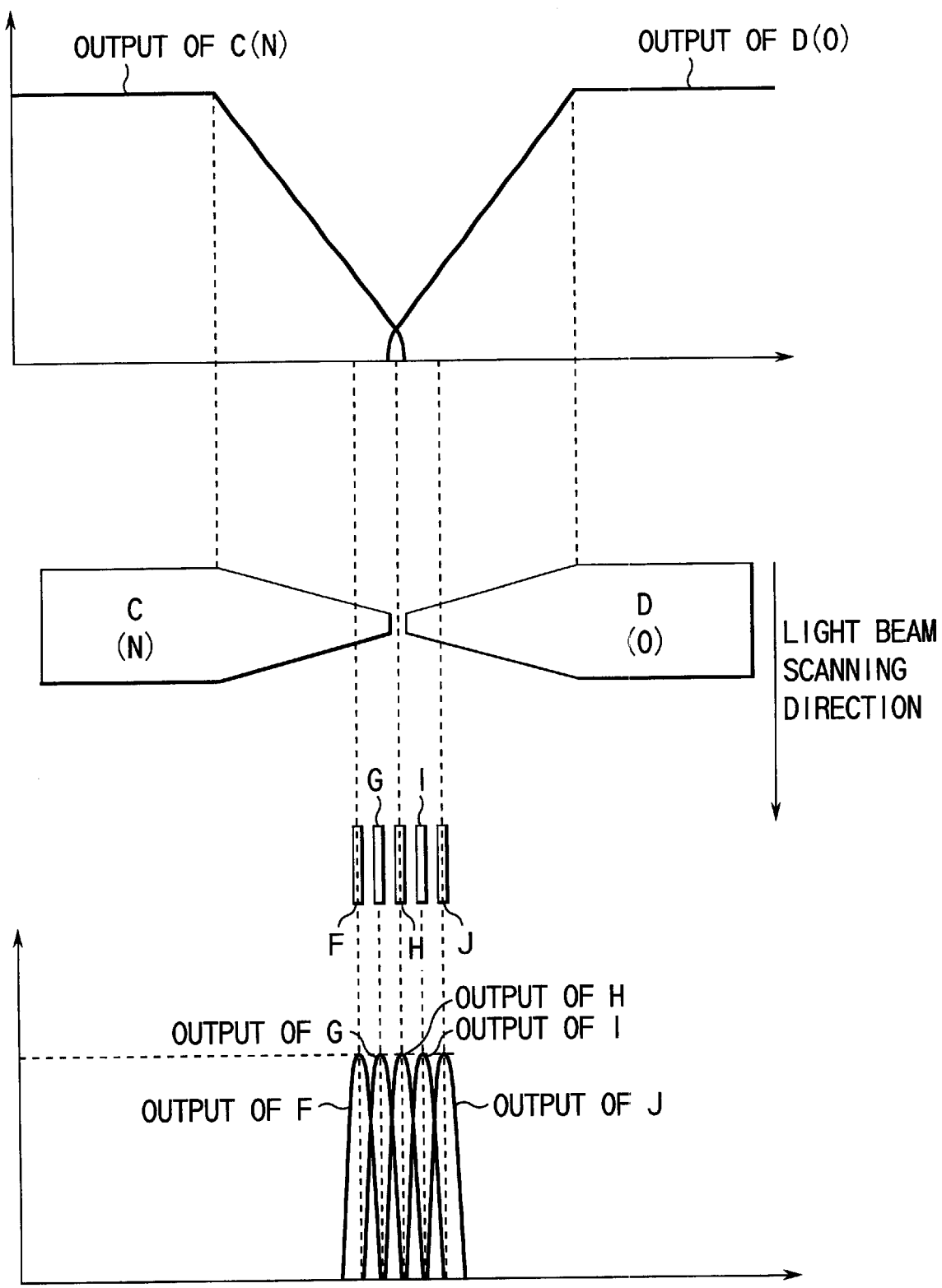
FIG. 14 is a diagram for illustrating the relation between the position of the sensor pattern in the light beam detecting device of FIG. 12 and an output thereof.

FIG. 14 shows the positional relation between the sensor patterns C (N), D (O) and the sensor patterns F, G, H, I, J and the relation between the positions and outputs of the sensor patterns. As shown in FIG. 14, the outputs of the tapered sensor patterns C (N), D (O) gradually vary with a variation in the light beam passage position. On the other hand, the outputs of the sensor patterns F, G, H, I, J abruptly vary with a slight variation in the light beam passage position.

Therefore, when the light beam passage position is greatly deviated from the positions of the sensor patterns F, G, H, I, J, the control operation can be efficiently effected by determining the light beam passage position based on the output signals of the tapered sensor patterns C (N), D (O) to control the galvanomirrors.

That is, the light beam detecting device 38 shown here has both of the light beam passage position detecting function of wide range for rough adjustment and the precise light beam passage position detecting function for fine adjustment in the light beam passage position control operation.

Figure 15:
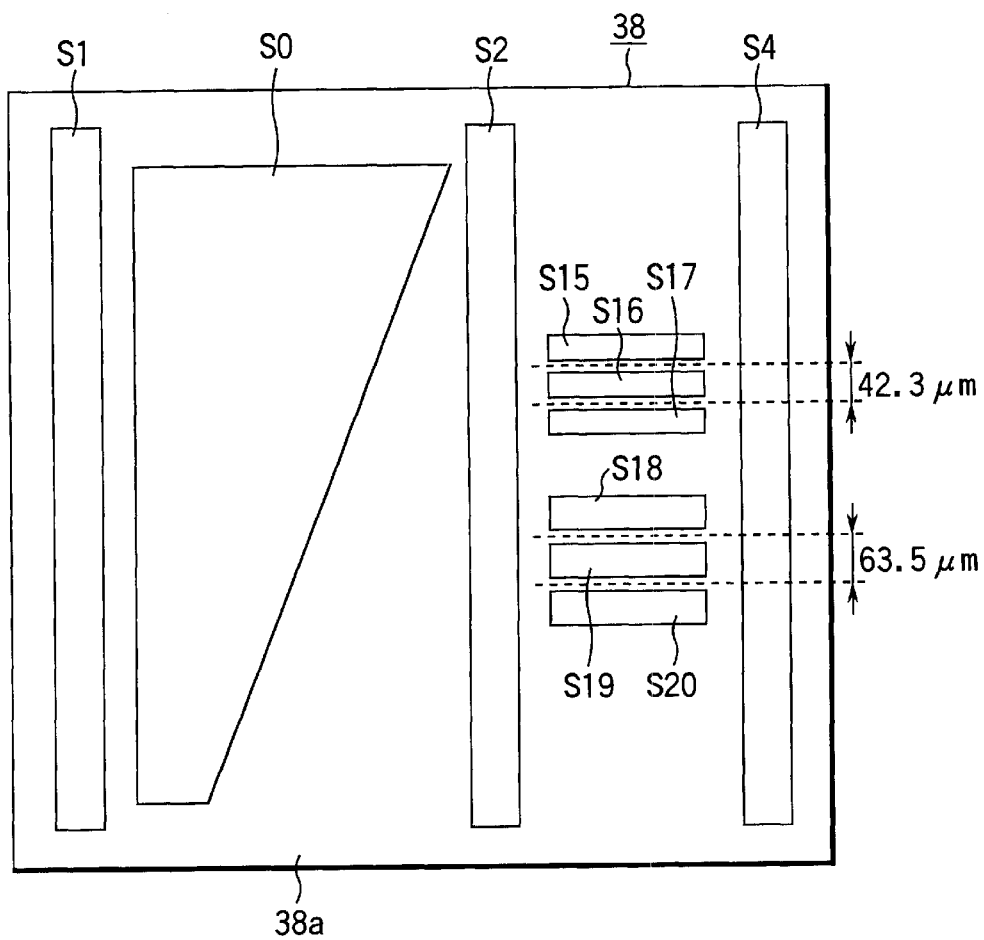
FIG. 15 is a structural view schematically showing still another example of the structure of the light beam detecting device.

FIG. 15 shows a light beam detecting device 38 having sensor patterns using the principle of this invention for detecting the light beam passage position and sensor patterns disclosed in Japanese Pat. Appln. KOKAI Publication No. 10-76704 which are integrally formed.

That is, the sensor patterns S1, S0, S2 are the sensor patterns of this invention which are explained so far and sensor patterns S15, S16, S17 and sensor patterns S18, S19, S20 are the same as the sensor pattern array disclosed in Japanese Pat. Appln. KOKAI Publication No. 10-76704.

Figures 16A, 16B:
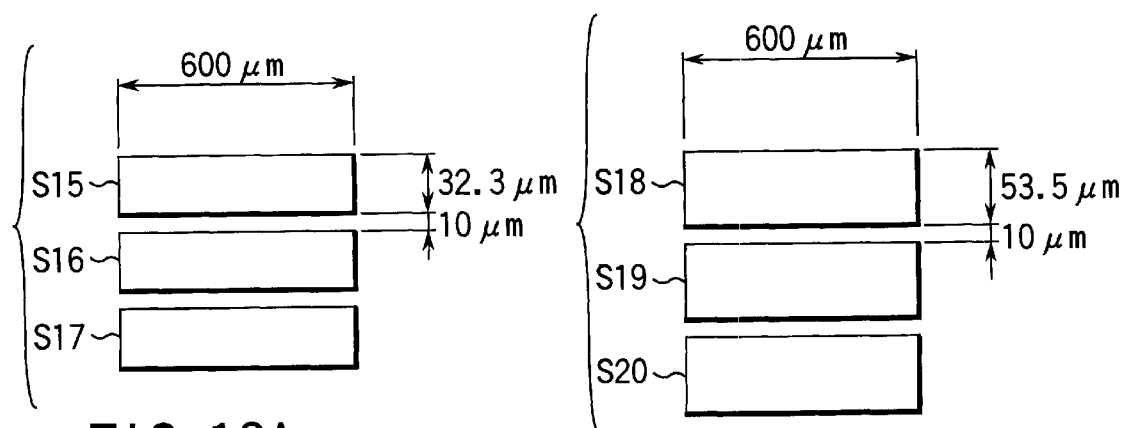
FIGS. 16A and 16B are views for illustrating the sizes of sensor pattern in the light beam detecting device of FIG. 15.

The arrangement of the sensor patterns S15, S16, S17 and sensor patterns S18, S19, S20 is briefly explained. For example, as shown in FIG. 16A, the sensor patterns S15, S16, S17 are arranged such that the size thereof in the main scanning direction of the light beam is 600 μm, the size thereof in the sub-scanning direction of the light beam is 32.2 μm and they are arranged at a regular interval of 10 μm in the sub-scanning direction. Therefore, the pitch between the gap center between the sensor patterns S15 and S16 and the gap center between the sensor patterns S16 and S17 is 42.3 μm.

For example, as shown in FIG. 16B, the size of each of the sensor patterns S18, S19, S20 is set to 600 μm in the main scanning direction and to 53.5 μm in the sub-scanning direction, and like the sensor patterns S15, S16, S17, they are arranged at a regular interval of 10 μm in the sub-scanning direction. Therefore, the pitch between the gap center between the sensor patterns S18 and S19 and the gap center between the sensor patterns S19 and S20 is 63.5 μm.

The light beam passage position control operation using the sensor patterns is disclosed in detail in Japanese Pat. Appln. KOKAI Publication No. 10-76704, but the feature thereof is briefly explained here.

For example, the sensor patterns S15, S16, S17 are sensor patterns for setting the light beam passage pitch (in the sub-scanning direction) to correspond to the resolution (first resolution) of 600 dpi. The interval between the two light beam passage positions is set to 42.3 μm, that is, it is set to correspond to the resolution of 600 dpi by driving one light beam into a portion (gap) between the sensor patterns S15 and S16 and driving the other light beam into a portion (gap) between the sensor patterns S16 and S17.

On the other hand, for example, the sensor patterns S18, S19, S20 are sensor patterns for setting the light beam passage pitch to correspond to the resolution (second resolution) of 400 dpi. The interval between the two light beam passage positions is set to 63.5 μm, that is, it is set to correspond to the resolution of 400 dpi by driving one light beam into a portion (gap) between the sensor patterns S18 and S19 and driving the other light beam into a portion (gap) between the sensor patterns S19 and S20.

Thus, since the array pitch of the sensor patterns is set equal to the light beam passage position pitch necessary for image formation, the light beam can be driven into a desired passage location with high precision.

However, the conventional light beam detecting device to which the above system is applied has a defect that the number of sensor patterns is increased when a large number of light beams to be controlled are used or the light beam passage pitch is set to correspond to a plurality of resolutions. Further, since it is necessary to control each light beam into a specified passage position between the sensor patterns, it is required to provide actuators (galvanomirrors) for changing the passage positions of the respective light beams.

The relative passage position can be detected by use of the light beam passage position detecting method of this invention explained so far if the light beam passes on the sensor pattern. Therefore, it is possible to reduce the number of actuators (galvanomirrors) by fixing the passage position of one light beam and controlling the passage position or positions of the other light beam or beams with the former light beam used as a reference.

However, when the light beam passage position is determined by use of only the tapered sensor pattern S0, the relative position of each light beam can be detected, but the absolute position thereof cannot be detected.

Therefore, in this invention, the sensor patterns such as the sensor patterns S15, S16, S17 and the sensor patterns S18, S19, S20 for detecting the absolute passage position of the light beam and the sensor pattern S0 for detecting the relative passage position of the light beam as explained before are integrally formed in the light beam detecting device so that both of the absolute passage position of the light beam and the relative positional relation can be detected.

That is, it is possible to use the sensor patterns S15, S16, S17 and the sensor patterns S18, S19, S20 as the absolute distance reference on the sensor and correct the result of detection by the sensor pattern S0.

Figure 17:
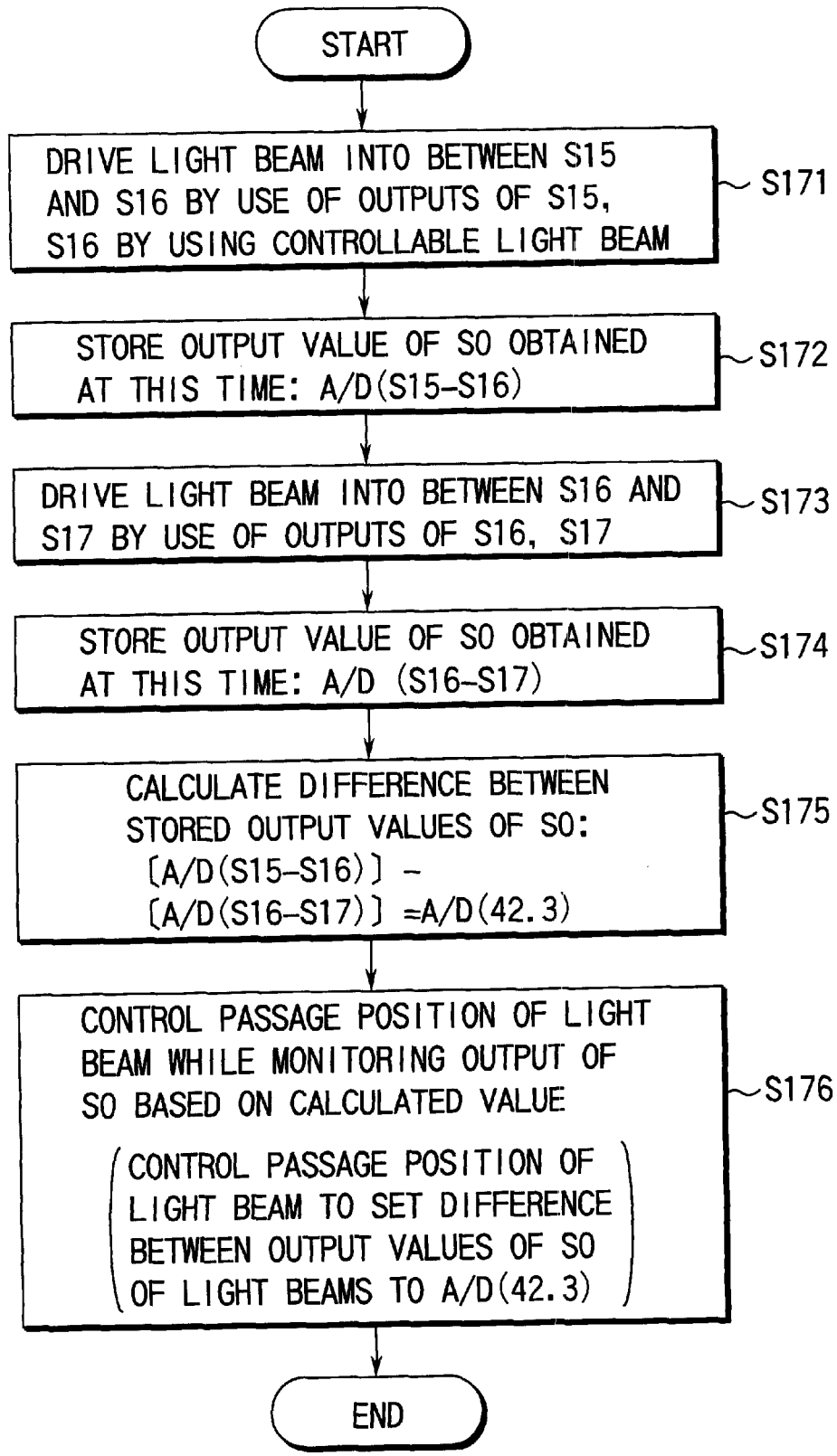
FIG. 17 is a flowchart for illustrating a method for making it possible to detect both of the absolute light beam passage position and relative positional relation by use of the light beam detecting device of FIG. 15.

Next, a method for permitting both of the absolute passage position of the light beam and the relative positional relation to be detected by use of the light beam detecting device 38 shown in FIG. 15 is explained with reference to the flowchart shown in FIG. 17.

First, the actuator is controlled so as to permit the light beam to pass through between the sensor patterns S15 and S16 by use of the light beam whose passage position can be changed by use of the actuator such as the galvanomirror (S171). The method is described in detail in Japanese Pat. Appln. KOKAI Publication No. 10-76704 and the explanation therefore is omitted.

A value output from the sensor pattern S0 is measured while the light beam passes through between the sensor patterns S15 and S16 and it is stored as A/D(S15-S16) (S172).

Next, the actuator is controlled so as to permit the beam light to pass through between the sensor patterns S16 and S17 by use of the light beam whose passage position can be changed by use of the actuator such as the galvanomirror (S173).

A value output from the sensor pattern S0 is measured while the light beam passes through between the sensor patterns S16 and S17 and it is stored as A/D(S16-S17) (S174).

A difference between the output of the sensor pattern S0 while the light beam passes through between the sensor patterns S15 and S16 and the output of the sensor pattern S0 while the light beam passes through between the sensor patterns S16 and S17 is calculated and stored as A/D(42.3) (S175).

The thus calculated value of A/D(42.3) indicates a variation amount of the output of the sensor pattern S0 when the light beam passage position is moved by 42.3 μm in the sub-scanning direction. Therefore, if the actuators are controlled to adjust the passage positions of the other light beams to preset positions based on the above value, the passage positions thereof can be precisely moved by 42.3 μm in the sub-scanning direction.

The operation for adjusting the passage positions of the plurality of light beams is effected after the powers of the plurality of light beams are uniformly adjusted. This is because variation amounts of the outputs from the sensor pattern S0 when the light beam passage positions are moved by 42.3 μm become different for the respective light beams if the powers of the light beams are not made uniform.

A case wherein the light beam passage positions are moved by 42.3 μm is explained, but it is clearly understood that the light beam passage positions can be precisely moved by 63.5 μm if the sensor patterns S18, S19, S20 are used and the explanation therefore is omitted.

Next another embodiment using the same principle is explained.

Figure 18:
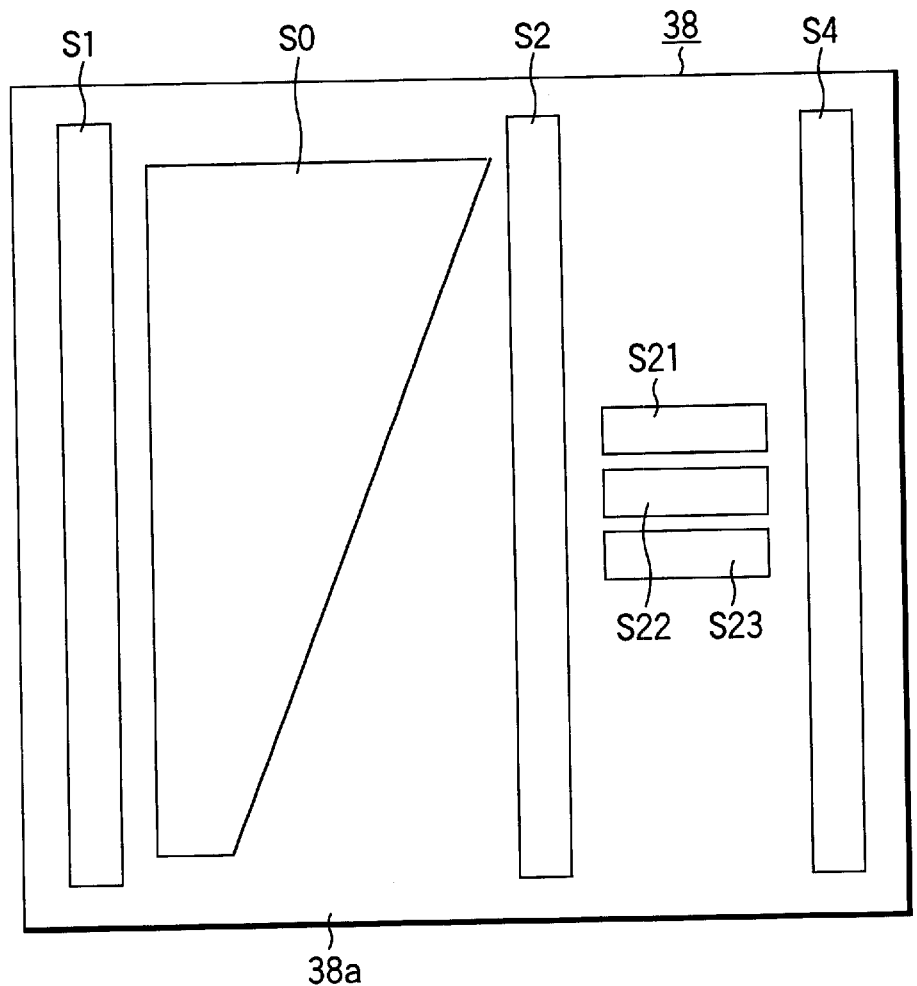
FIG. 18 is a structural view schematically showing another example of the structure of the light beam detecting device.

Like the case of FIG. 15, FIG. 18 shows a light beam detecting device 38 having sensor patterns using the principle of this invention for detecting the light beam passage position and sensor patterns disclosed in Japanese Pat. Appln. KOKAI Publication No. 10-76704 which are integrally formed.

That is, sensor patterns S1, S0, S2 are the sensor patterns of this invention which are explained so far and sensor patterns S21, S22, S23 are the same as the sensor pattern array disclosed in Japanese Pat. Appln. KOKAI Publication No. 10-76704.

Figure 19:
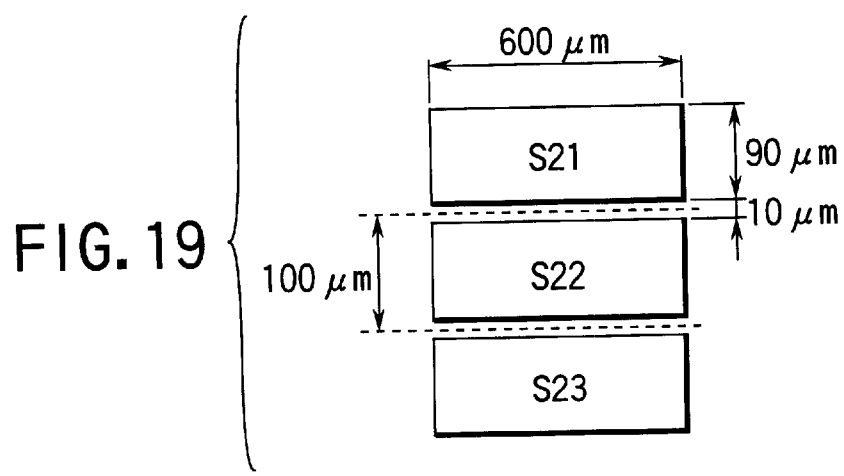
FIG. 19 is a view for illustrating the size of sensor pattern in the light beam detecting device of FIG. 18.

The arrangement of the sensor patterns S21, S22, S23 is briefly explained. For example, as shown in FIG. 19, the sensor patterns S21, S22, S23 are arranged such that the size thereof in the light beam scanning direction (main scanning direction) is 600 $\mu$m, the size thereof in a direction (sub-scanning direction) perpendicular to the light beam scanning direction is 90 $\mu$m and they are arranged at a regular interval of 10 $\mu$m in the sub-scanning direction. Therefore, the pitch between the gap center between the sensor patterns S21 and S22 and the gap center between the sensor patterns S22 and S23 is 100 $\mu$m.

Figure 20:
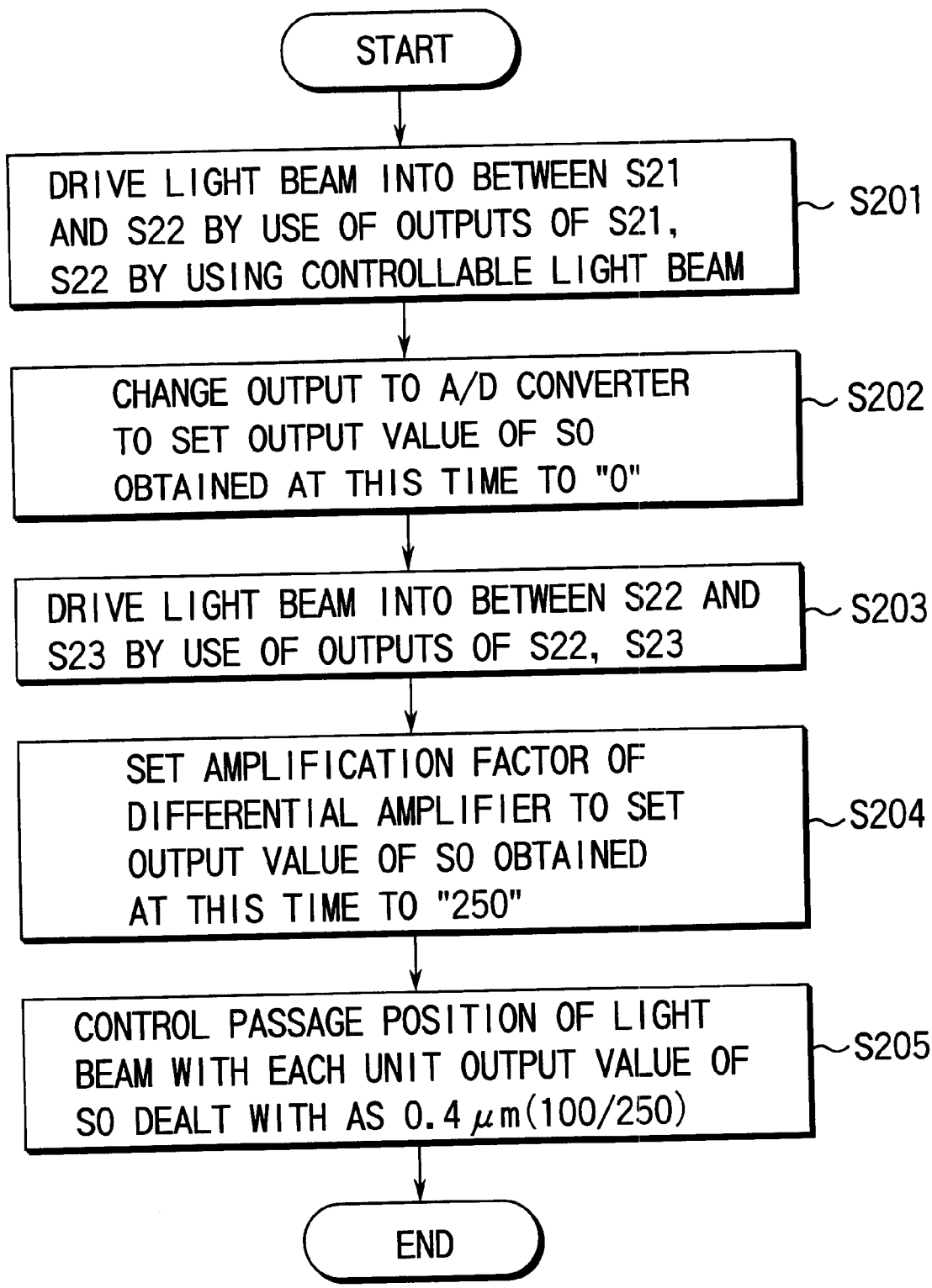
FIG. 20 is a flowchart for illustrating the light beam passage position control process using the light beam detecting device of FIG. 18.

Next, a method for controlling the passage position of the light beam by use of the light beam detecting device 38 shown in FIG. 18 is explained with reference to the flowchart shown in FIG. 20. In this example, a case wherein an inexpensive 8-bit device is used as the A/D converter 43 is explained.

First, the actuator is controlled so as to permit the beam light to pass through between the sensor patterns S21 and S22 based on outputs of the sensor patterns S2, S4, S21, S22 by use of the light beam whose passage position can be changed by use of the actuator such as the galvanomirror (S201).

An output value to the D/A converter 61 (refer to FIG. 5) is changed so as to set a value output from the sensor pattern S0 to "0" while the light beam passes through between the sensor patterns S21 and S22 (S202).

Next, the actuator is controlled so as to permit the beam light to pass through between the sensor patterns S22 and S23 by use of the light beam whose passage position can be changed by use of the actuator such as the galvanomirror (S203).

The amplification factor of the amplifier 60 is set so as to set a value output from the sensor pattern S0 to "250", while the light beam passes through between the sensor patterns S22 and S23 (S204). Then, the passage position of the light beam is controlled by dealing with each ("1") of the values of the output from the sensor pattern S0 as 0.4 $\mu$m (100 $\mu$m/250) (S205).

Thus, it becomes possible to set a special relation between the output of the sensor pattern S0 and a variation in the light beam passage position by setting the output to the D/A converter 61 and the amplification factor of the amplifier 60 so that the output of the sensor pattern S0 will be set to "0" while the beam light passes through between the sensor patterns S21 and S22 and the output of the sensor pattern S0 will be set to "250" while the beam light passes through between the sensor patterns S22 and S23.

That is, when the passage position of the light beam is changed from a portion between the sensor patterns S21 and S22 to a portion between the sensor patterns S22 and S23, the passage position is changed by 100 $\mu$m on the light beam detecting device 38. At this time, since a change in the output of the sensor pattern S0 is "250", the variation in the light beam passage position for each output value "1" of the sensor pattern S0 can be set to 0.4 $\mu$m (100 $\mu$m/250).

Therefore, the main control section 51 can control the passage positions of the respective light beams to desired positions by measuring the relative passage positions of the light beams by use of the output of the sensor pattern S0 and controlling the actuators by use of the result of measurement.

In the example in which the 8-bit A/D converter is used as the A/D converter 43, the measurement range is 102.4 $\mu$m (0.4 $\mu$m×256). Therefore, the to-be-measured light beam may exceed the range of the A/D converter 43 to cause a trouble in the measurement in some cases. However, in such a case, the trouble can be coped with by changing the setting value to the D/A converter 61 to move the measurement range.

Next, still another embodiment using the principle of this invention is explained.

Figure 21:
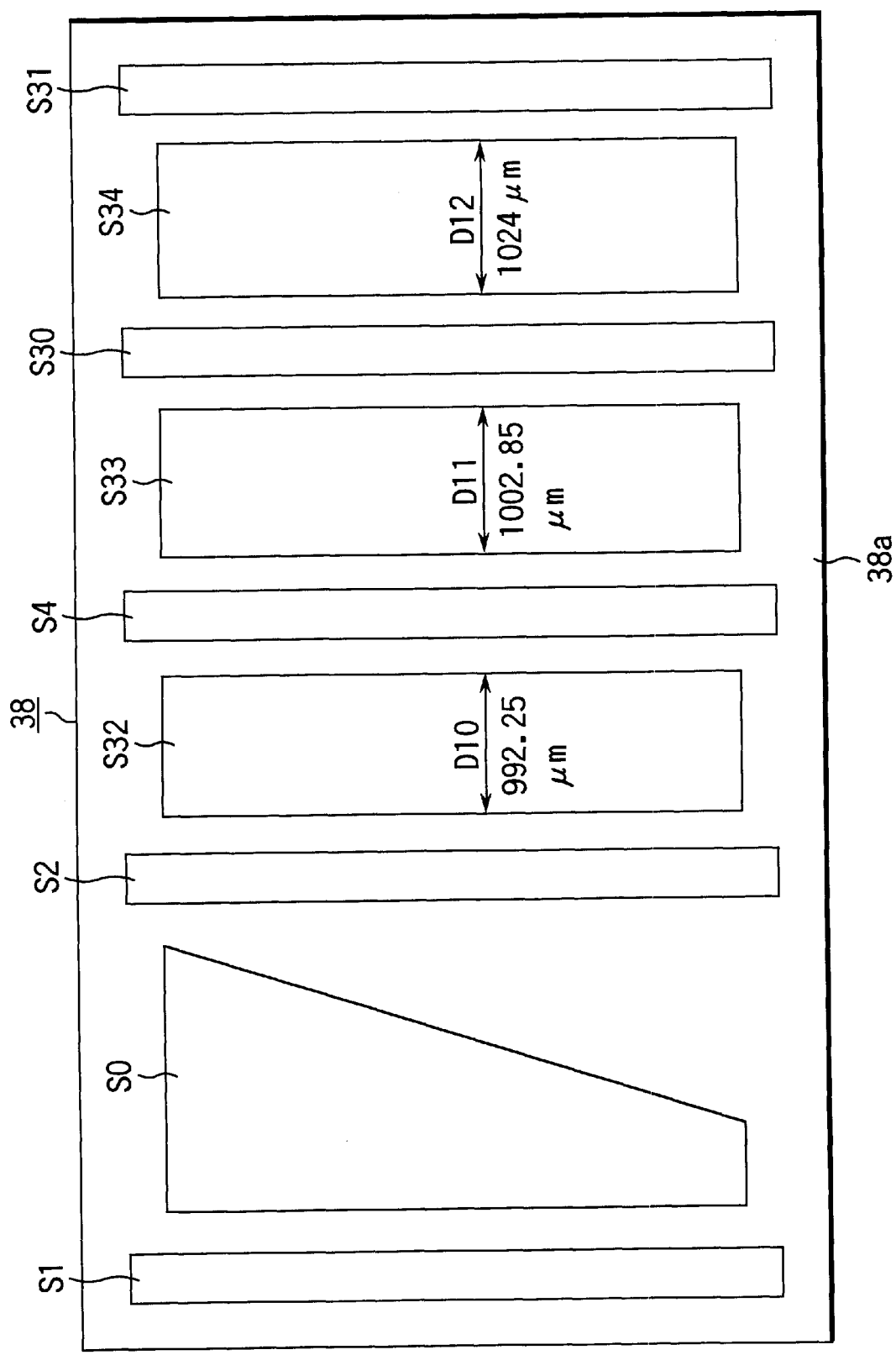
FIG. 21 is a structural view schematically showing still another example of the structure of the light beam detecting device.

FIG. 21 shows a light beam detecting device 38 having sensor patterns S4, S30, S31, S32, S33, S34 in addition to the sensor patterns S1, S0, S2 using the principle of this invention for detecting the light beam passage position.

Figure 22A:
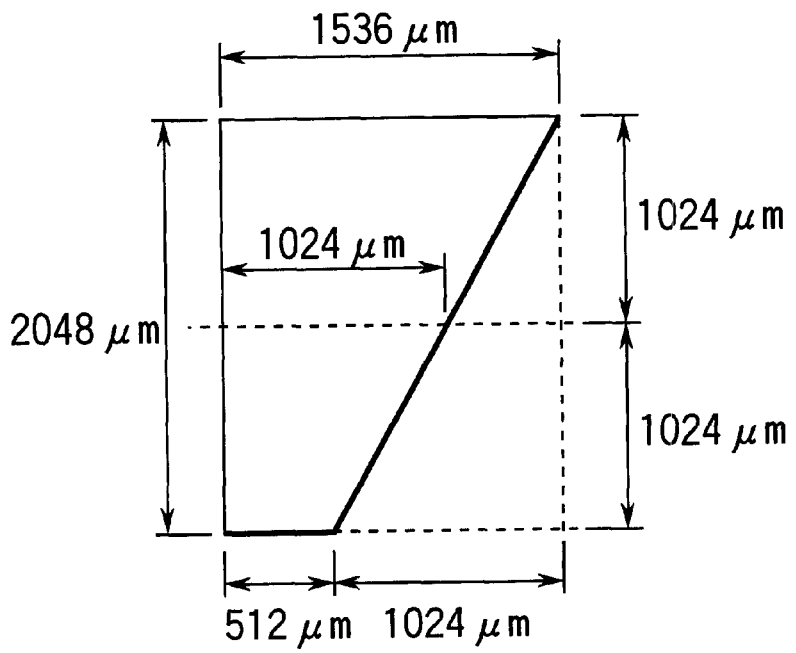
FIGS. 22A and 22B are views for illustrating the sizes of sensor patterns in the light beam detecting device of FIG. 21.

For example, as shown in FIG. 22A, the shape of the sensor pattern S0 is a trapezoidal form in which the length thereof in the sub-scanning direction is 2048 $\mu$m, the length of the long side in the main scanning direction is 1536 $\mu$m and the length of the short side is 512 $\mu$m. Therefore, the inclination of the inclined side is "2" (2048/1024).

When the light beam scanned by the polygon mirror passes on the sensor pattern S0, the ratio of a variation (in the main scanning direction) in the distance by which the light beam travels on the sensor pattern to a variation (in the sub-scanning direction) in the light beam passage position is 2:1. This is because the inclination of the inclined side of the sensor pattern S0 is "2".

For example, the sensor pattern S34 is formed in a rectangular form in which the length of a side in the sub-scanning direction is 2048 $\mu$m and the length (D12) of a side in the main scanning direction is 1024 $\mu$m. For example, the sensor pattern S33 is formed in a rectangular form in which the length of a side in the sub-scanning direction is 2048 $\mu$m and the length (D11) of a side in the main scanning direction is 1002.85 $\mu$m. For example, the sensor pattern S32 is formed in a rectangular form in which the length of a side in the sub-scanning direction is 2048 $\mu$m and the length (D10) of a side in the main scanning direction is 992.25 $\mu$m.

That is, differences of 31.75 $\mu$m and 21.15 $\mu$m are set between the lengths of the sensor patterns S32 and S34 and the lengths of the sensor patterns S33 and S34 in the main scanning direction. The differences are set equal to variations in the traveling distance of the light beam on the sensor pattern S0 when the position in which the light beam passes on the sensor pattern S0 is moved by 63.5 $\mu$m (corresponding to the resolution of 400 dpi) and 42.3 $\mu$m (corresponding to the resolution of 600 dpi) in the sub-scanning direction.

Figure 22B:
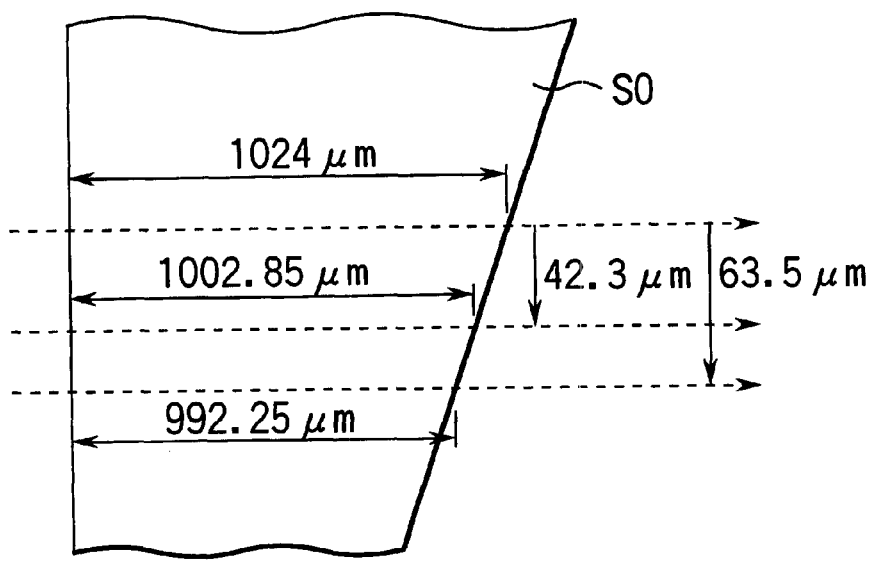

For example, as shown in FIG. 22B, when the light beam passes through the mid portion in the sub-scanning direction, the traveling distance on the sensor pattern S0 is 1024 $\mu$m (=(1536+512)/2). If a case wherein the light beam passage position is downwardly shifted by 42.3 $\mu$m is considered, then the light beam traveling distance on the sensor pattern S0 is shortened by 21.15 (=42.3/2) $\mu$m and becomes 1002.85 $\mu$m.

Therefore, for example, a value obtained by subtracting the output integrating value of the sensor pattern S33 from the output integrating value (reference value) of the sensor pattern S34 becomes equal to a variation amount of the output integrating value of the sensor pattern S0 obtained when the light beam passage position is changed by 42.3 $\mu$m.

Therefore, the light beam passage position is so controlled that a difference between the output integrating value of the sensor pattern S0 by the first light beam and the output integrating value of the sensor pattern S0 by the second light beam will become equal to a difference between the output integrating values obtained when the light beam passes on the sensor patterns S34 and S33. As a result, the first and second light beams scan the light beam detecting device 38 with a distance of 42.3 μm set apart from each other in the sub-scanning direction.

Further, for example, a value obtained by subtracting the output integrating value of the sensor pattern S32 from the output integrating value (reference value) of the sensor pattern S34 becomes equal to a variation amount of the output integrating value of the sensor pattern S0 obtained when the light beam passage position is changed by 63.5 μm.

Therefore, the light beam passage position is so controlled that a difference between the output integrating value of the sensor pattern S0 by the reference light beam and the output integrating value of the sensor pattern S0 by the to-be-controlled light beam will become equal to a difference between the output integrating values obtained when the light beam passes on the sensor patterns S34 and S32. As a result, the reference and to-be-controlled light beams scan the light beam detecting device 38 with a distance of 63.5 μm set apart from each other in the sub-scanning direction.

The operation for controlling the light beam passage position by using the light beam detecting device 38 of FIG. 21 has been explained above.

Next, a method for controlling the light beam passage position by use of the same principle is explained.

Figure 23:
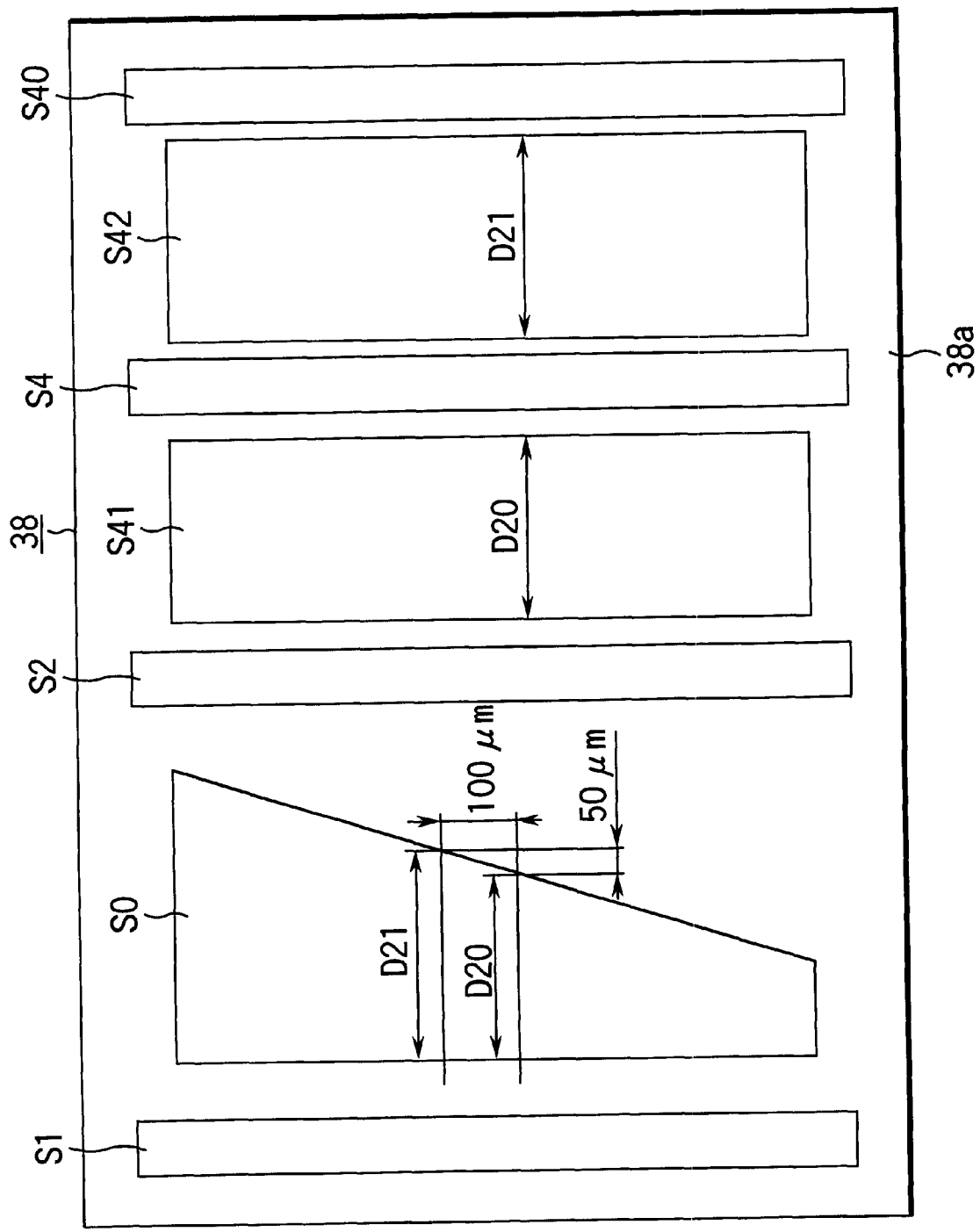
FIG. 23 is a structural view schematically showing another example of the structure of the light beam detecting device.

FIG. 23 shows a light beam detecting device 38 having sensor patterns S4, S40, S41, S42 in addition to the sensor patterns S1, S0, S2 using the principle of this invention for detecting the light beam passage position.

The principle used for control is the same as that used in the case of FIG. 21, but it is featured in the difference between the sizes of the sensor patterns S41 and S42 in the main scanning direction. That is, the size D21 of the sensor pattern S42 in the main scanning direction is 1024 μm, for example, and the size D20 of the sensor pattern S41 in the main scanning direction is 974 μm, for example. A difference between the sizes of D21 and D20 is 50 μm. As shown in FIG. 23, the difference is equal to the light beam traveling distance on the sensor pattern S0 when the light beam passage position is changed by 100 μm in the main scanning direction.

Therefore, for example, a value obtained by subtracting the output integrating value of the sensor pattern S41 from the output integrating value (reference value) of the sensor pattern S42 becomes equal to a variation amount of the output integrating value of the sensor pattern S0 obtained when the light beam passage position on the sensor pattern S0 is changed by 100 μm. That is, a variation amount of the output integrating value of the sensor pattern S0 with respect to a variation of 100 μm of the light beam passage position in the sub-scanning direction can be obtained. The relation can be used for controlling the light beam passage position.

Also, in this embodiment, like the control method using the light beam detecting device 38 shown in FIGS. 18 and 19, the above relation (a variation amount of the output integrating value of the sensor pattern S0 obtained when the light beam passage position is changed by 100 μm) can be easily derived by changing the setting value to the D/A converter 61 of FIG. 5 and the setting value to the differential amplifier 60.

By using the above relation, the passage position of the to-be-controlled light beam is changed so that the output integrating value of the sensor pattern S0 by the reference light beam and the output integrating value of the sensor pattern S0 by the to-be-controlled light beam can be set to a preset relation. As a result, the light beams scan the light beam detecting device 38 with a preset distance therebetween.

As described above, according to this invention, a light beam scanning apparatus can be provided in which the relative and absolute scanning positions of the light beam can be precisely detected in a wide range and the scanning position of the light beam can be controlled to a preset position by use of the least sufficient number of actuators for controlling the light beam passage position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:
   a plurality of light beam emitting devices for outputting light beams;
   a beam scanner for reflecting the light beams output from said light beam emitting devices towards a to-be-scanned surface to scan the to-be-scanned surface by use of the light beams in a main scanning direction;
   a beam position detector for detecting the light beam scanned on the to-moved surface by said beam scanner and generating an analog signal which is continuously changed with a variation in the passage position in a sub-scanning direction perpendicular to the main scanning direction of the light beam;
   a first target light detecting member having a first passage target and disposed separately from said beam position detector in the main scanning direction;
   a second target light detecting member having a second passage target separated from the first passage target in the sub-scanning direction by a distance corresponding to preset resolution;
   light beam passage position changing means for changing the passage position of at least one of the plurality of light beams; and
   a controller for controlling the relation of the respective passage positions of the plurality of light beams to a preset relation by use of said light beam passage position changing means based on the outputs of said beam position detector respectively obtained when the light beam has passed through the first and second passage targets.

2. The apparatus according to claim 1, wherein said controller includes:
   calculating means for calculating a difference between the outputs of said beam position detector respectively obtained when the light beam has passed through the first and second passage targets; and
   means for controlling the change of the passage position of one of first and second light beams among the plurality of light beams by use of said beam passage position changing means to set the difference calculated by said calculating means equal to a difference between outputs of said beam position detector respectively obtained at the time of scanning by the first and second light beams.

3. The apparatus according to claim 2, which further comprises:
   a third target light detecting member having a third passage target and disposed separately from said beam position detector in the main scanning direction; and a fourth target light detecting member having a fourth passage target separated from the third passage target in the sub-scanning direction by a distance corresponding to second resolution; and in which said calculating means calculates a difference between the outputs of said beam position detector respectively obtained when the light beam has passed through the third and fourth passage targets and said controlling means controls said beam passage position changing means to set the difference calculated by said calculating means equal to a difference between outputs of said beam position detector respectively obtained at the time of scanning by the first and second light beams among the plurality of light beams.

4. The apparatus according to claim 1, wherein said controller includes means for calculating an output variation rate with respect to a variation in the passage position of the light beam of said beam position detector based on the outputs of said beam position detector respectively obtained when the light beam has passed through the first and second light passage targets; and means for controlling the passage positions of plurality of light beams based on the variation rate.

5. A light beam scanning apparatus comprising:

a plurality of light beam emitting devices for outputting light beams;

a beam scanner for reflecting said plurality of light beams output from said plurality of light beam emitting devices toward a to-moved surface to scan the to-be-scanned surface by use of the plurality of light beams;

a beam position detector for detecting the light beam scanned across the to-be-scanned surface and generating an analog signal which is continuously changed with a variation in the passage position in a sub-scanning direction perpendicular to the main scanning direction of the light beam;

a first target beam sensing member located away from the beam position detector in the main scanning direction and having a first passage target;

a second target beam sensing member having a second passage target which is located away from the first passage target in the sub-scanning direction by a distance corresponding to a predetermined resolution;

light beam passage position changing means for changing a passage position of at least one of said plurality of light beams; and a controller including, first means for controlling the light beam passage position changing means such that the light beam passes the first passage target, and for receiving a first sensing output produced from the beam position detector;

second means for controlling the light beam passage position changing means such that the light beam passes the second passage target, and for receiving a second sensing output produced from the beam position detector; and third means for controlling the light beam passage position changing means on the basis of the first and second sensing outputs received by the first and second means while sensing the scan position relationship of the light beams by use of said beam position detector, such that said plurality of light beams satisfy a predetermined scan position relationship.

6. A light beam scanning apparatus according to claim 5, wherein said third means includes:

calculation means for calculating a difference between the first sensing output received by the first means and the second sensing output received by the second means; and control means for controlling a change in the passage position of one of first and second light beams, which are included among said plurality of light beams, by use of the light beam passage position changing means, such that the difference calculated by the calculation means becomes equal to a difference between outputs which the beam position detector produces in response to the first and second light beams.

7. A light beam scanning apparatus according to claim 5, further comprising:

a third target beam sensing member located away from the beam position detector in the main scanning direction and having a third passage target; and a fourth target beam sensing member having a fourth passage target which is located away from the third passage target in the sub-scanning direction by a distance corresponding to a second resolution, wherein said controller further includes:

fourth means for controlling the light beam passage position changing means such that the light beam passes the third passage target, and for receiving a third sensing output produced from the beam position detector;

fifth means for controlling the light beam passage position changing means such that the light beam passes the fourth passage target, and for receiving a fourth sensing output produced from the beam position detector; and sixth means for controlling the light beam passage position changing means on the basis of the fourth and fifth sensing outputs received by the fourth and fifth means while sensing the scan position relationship of the light beams by use of said beam position detector, such that said plurality of light beams satisfy a predetermined scan position relationship.

8. A light beam scanning apparatus according to claim 5, wherein said third means includes;

calculation means for calculating a change rate at which an output from the beam position detector changes in relation to a change in the passage position of the light beam, on the basis of the first and second sensing outputs received by the first and second means and a distance between the first and second passage targets, as measured in the sub-scanning direction; and control means for controlling the light beam passage position changing means on the basis of the change rate calculated by the calculation means while sensing the scan position relationship of the light beams by use of said beam position detector, such that said plurality of light beams satisfy another predetermined scan position relationship.

* * * * *